United States Patent
Furukawa

(10) Patent No.: US 12,341,944 B2
(45) Date of Patent: Jun. 24, 2025

(54) INFORMATION PROCESSING APPARATUS, INFORMATION PROCESSING METHOD, VIDEO DISPLAY SYSTEM, AND STORAGE MEDIUM

(71) Applicant: CANON KABUSHIKI KAISHA, Tokyo (JP)

(72) Inventor: Takeshi Furukawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 434 days.

(21) Appl. No.: 17/857,306

(22) Filed: Jul. 5, 2022

(65) Prior Publication Data
US 2023/0009185 A1    Jan. 12, 2023

(30) Foreign Application Priority Data
Jul. 9, 2021    (JP) ................. 2021-114389

(51) Int. Cl.
*H04N 13/194* (2018.01)
*H04N 13/106* (2018.01)
*H04N 13/117* (2018.01)
*H04N 13/167* (2018.01)

(52) U.S. Cl.
CPC ......... *H04N 13/194* (2018.05); *H04N 13/117* (2018.05); *H04N 13/158* (2018.05); *H04N 13/167* (2018.05)

(58) Field of Classification Search
CPC .. H04N 13/194; H04N 13/167; H04N 13/117; H04N 13/158
USPC ........................................................ 348/43
See application file for complete search history.

(56) References Cited

U.S. PATENT DOCUMENTS

| | | | |
|---|---|---|---|
| 11,689,706 B2 * | 6/2023 | Handa .................. | H04N 13/282 348/47 |
| 2018/0330163 A1 | 11/2018 | Matsuzaki | |
| 2019/0037199 A1 * | 1/2019 | Kato ................... | H04N 13/398 |
| 2019/0349531 A1 | 11/2019 | Aizawa | |
| 2020/0351525 A1 | 11/2020 | Sugimoto | |

FOREIGN PATENT DOCUMENTS

| | | |
|---|---|---|
| EP | 3723365 A1 | 10/2020 |
| JP | 2014-041259 A | 3/2014 |

OTHER PUBLICATIONS

Extended European Search Report issued in corresponding EP Patent Application No. 22181226.6, dated Dec. 5, 2022, pp. 1-9.
European Office Action issued by the European Patent Office on Feb. 20, 2025 in corresponding EP Patent Application No. 22181226.6.

* cited by examiner

*Primary Examiner* — Sath V Perungavoor
*Assistant Examiner* — Kristin Dobbs
(74) *Attorney, Agent, or Firm* — Carter, DeLuca & Farrell LLP

(57) ABSTRACT

An information processing apparatus determines which of a first method for generating virtual viewpoint video upon receiving from an external apparatus object data used for generation of the virtual viewpoint video or a second method for receiving from the external apparatus virtual viewpoint video generated upon a virtual viewpoint designated for generation of the virtual viewpoint video to use as a delivery method for delivery of the virtual viewpoint video; and obtains the virtual viewpoint video by using the determined delivery method.

13 Claims, 14 Drawing Sheets

FIG. 2

| | | DELIVERY METHOD A | DELIVERY METHOD B | DELIVERY METHOD C |
|---|---|---|---|---|
| COMMUNICATION DATA | DOWNLOAD (VIDEO DELIVERY APPARATUS → VIDEO VIEWING APPARATUS) | THREE-DIMENSIONAL SHAPE DATA AND TEXTURE | TWO-DIMENSIONAL VIDEO DATA | TWO-DIMENSIONAL VIDEO DATA |
| | UPLOAD (VIDEO VIEWING APPARATUS → VIDEO DELIVERY APPARATUS) | • EVENT TIME | • POSITION AND ORIENTATION OF VIRTUAL CAMERA<br>• EVENT TIME | • SELECTION OF VIRTUAL CAMERA |
| APPARATUS FOR GENERATING VIRTUAL VIEWPOINT VIDEO TO BE DISPLAYED | | VIDEO VIEWING APPARATUS | VIDEO DELIVERY APPARATUS | VIDEO DELIVERY APPARATUS |
| VIRTUAL CAMERA OPERABILITY | LATENCY | SMALL | LARGE | LARGE |
| | DESIGNATABLE POSITION | ANY POSITION CAN BE DESIGNATED | ANY POSITION CAN BE DESIGNATED | ONLY LIMITED POSITIONS AVAILABLE |
| COMMUNICATION BAND | DOWNLOAD | LARGE(1Gbps) | SMALL(5Mbps) | SMALL(5Mbps) |
| | UPLOAD | SMALL (1Mbps LESS) | MEDIUM (1Mbps) | SMALL (1Mbps LESS) |
| PROCESSING LOAD OF VIDEO VIEWING APPARATUS | | LARGE | SMALL | SMALL |
| PROCESSING LOAD OF VIDEO DELIVERY APPARATUS | | SMALL | LARGE | MEDIUM |

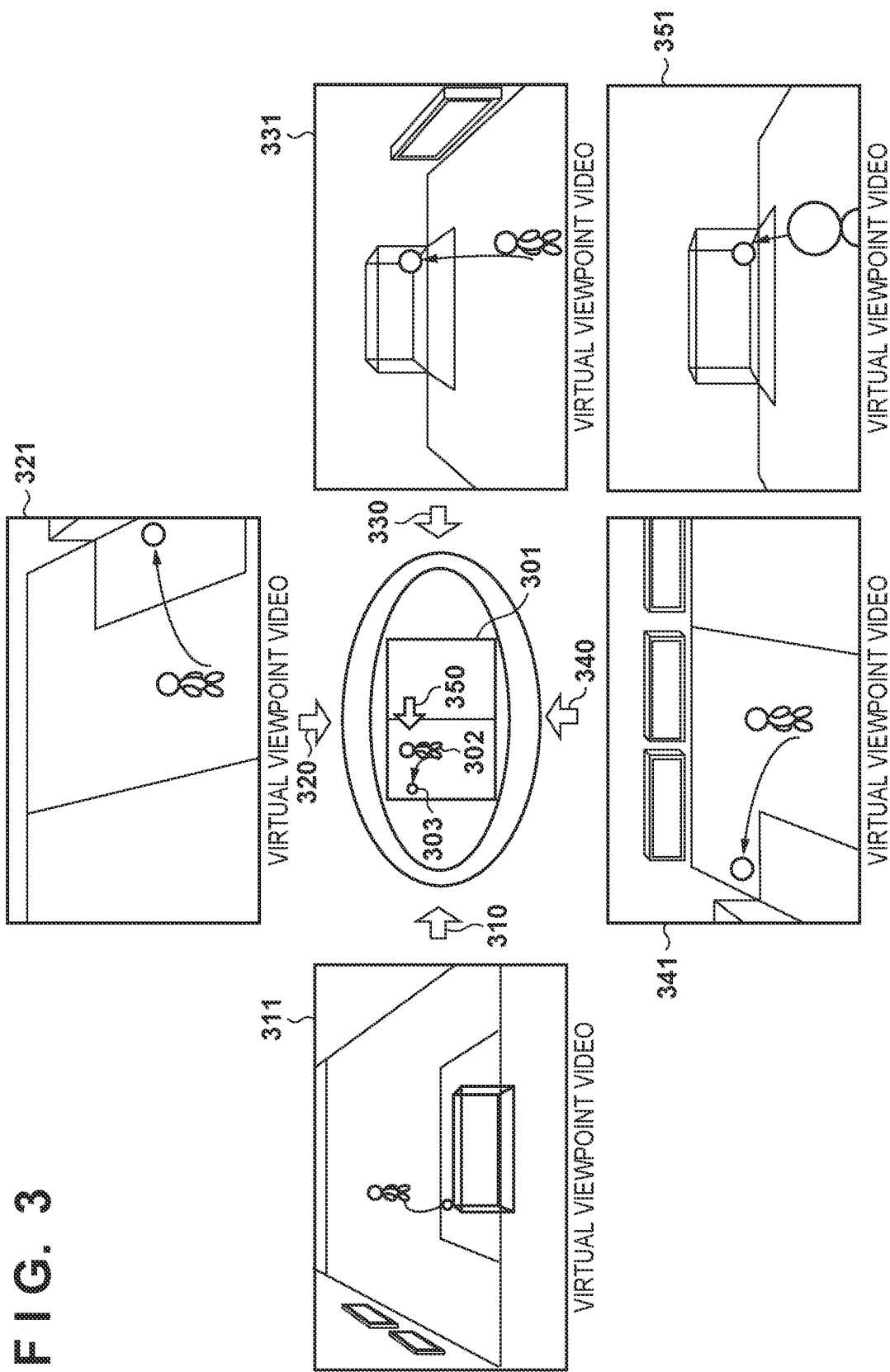

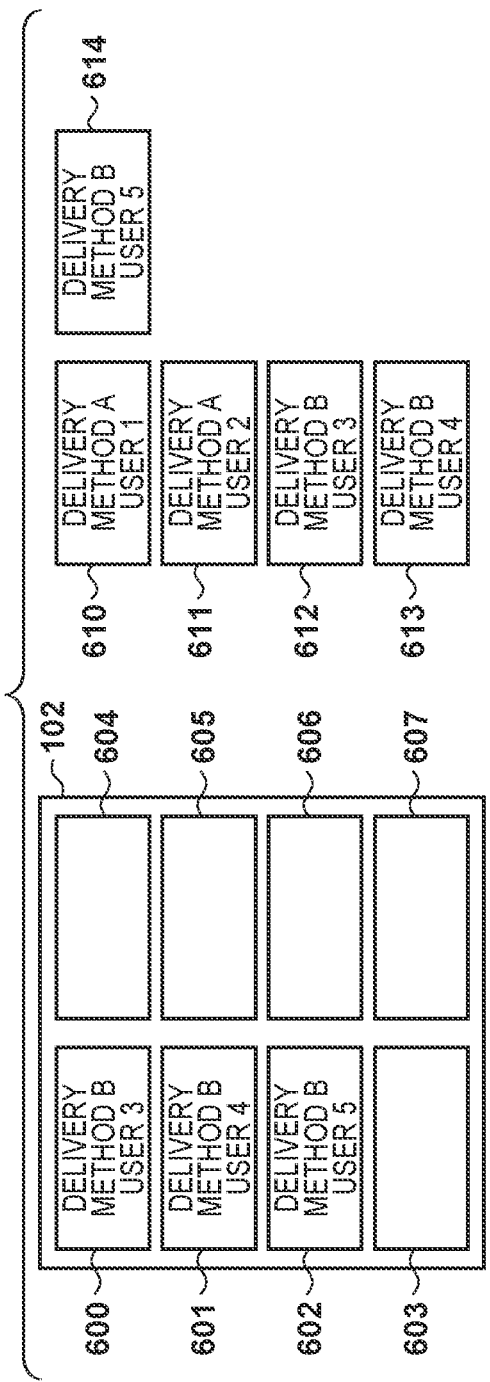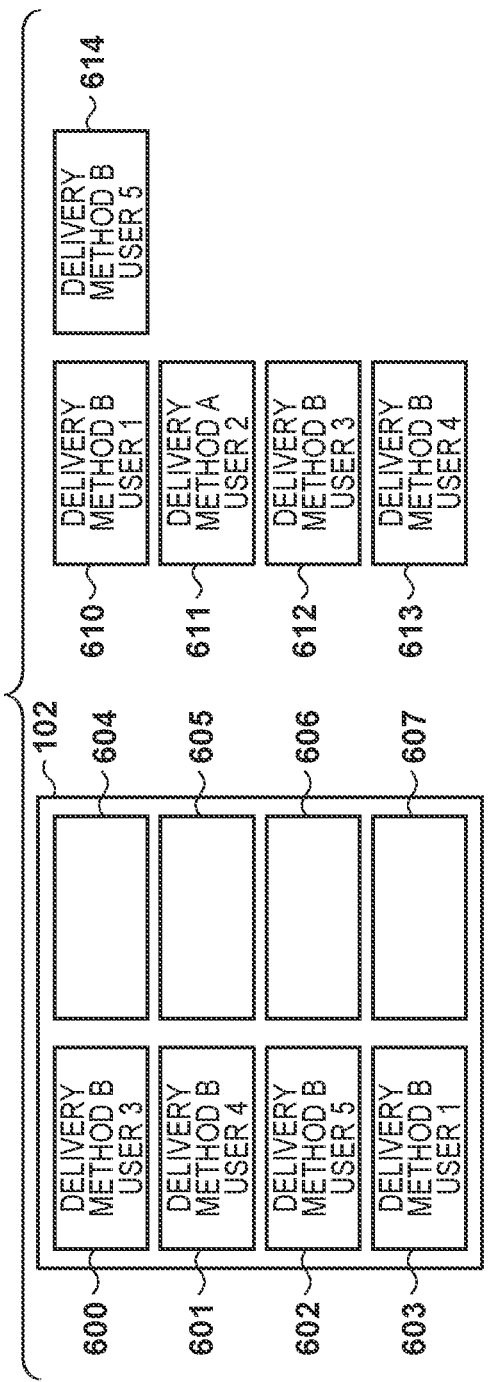

FIG. 7A

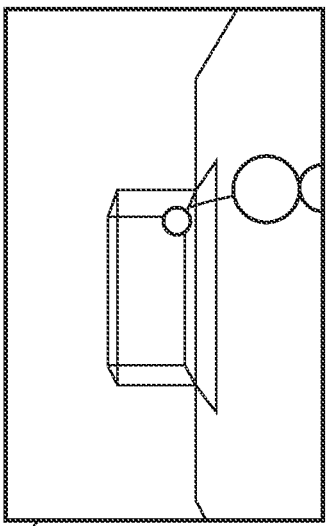

700

DELIVERY METHOD A
(USER DESIGNATED POSITION
AND ORIENTATION)

TIME:01:20:10
VIRTUAL CAMERA POSITION
AND ORIENTATION:X:200
Y:250
Z:20
PAN:0
TILT:10
ROLL:0

FIG. 7B

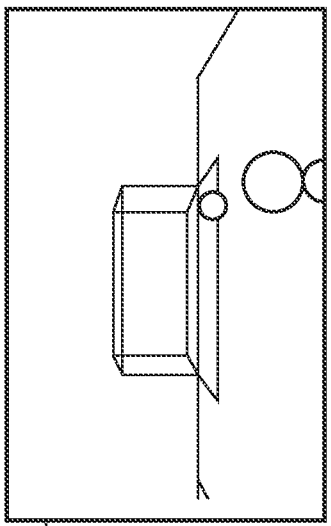

701

DELIVERY METHOD A
(WHILE SWITCHING DELIVERY METHOD:
AUTOMATIC COMPLEMENTING)

TIME:01:20:09
VIRTUAL CAMERA POSITION
AND ORIENTATION:X:201
Y:250
Z:70
PAN:0
TILT:20
ROLL:0

FIG. 7C

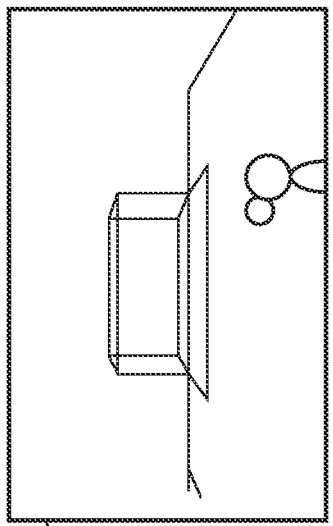

702

DELIVERY METHOD A
(WHILE SWITCHING DELIVERY METHOD:
AUTOMATIC COMPLEMENTING)

TIME:01:20:08
VIRTUAL CAMERA POSITION
AND ORIENTATION:X:202
Y:250
Z:120
PAN:0
TILT:30
ROLL:0

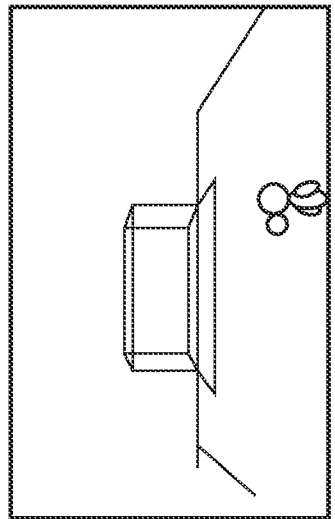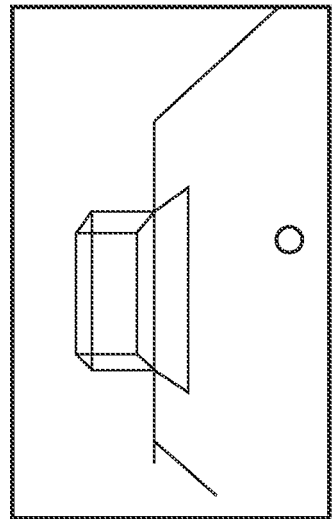
FIG. 7D  
DELIVERY METHOD A  
(WHILE SWITCHING DELIVERY METHOD: AUTOMATIC COMPLEMENTING)
TIME:01:20:07  
VIRTUAL CAMERA POSITION AND ORIENTATION:X:203  
Y:250  
Z:170  
PAN:0  
TILT:40  
ROLL:0
FIG. 7E  
DELIVERY METHOD C  
(PRE-FIXED POSITION AND ORIENTATION)
TIME:01:20:06  
VIRTUAL CAMERA POSITION AND ORIENTATION:X:204  
Y:250  
Z:220  
PAN:0  
TILT:50  
ROLL:0

INFORMATION PROCESSING APPARATUS, INFORMATION PROCESSING METHOD, VIDEO DISPLAY SYSTEM, AND STORAGE MEDIUM

BACKGROUND

Field

The present disclosure relates to an information processing apparatus, an information processing method, a video display system, and a storage medium.

Description of the Related Art

Recently, the technology of a virtual viewpoint video in which an object can be viewed as video from various viewpoint positions and viewing directions has been getting attention. By this technique, for example, a soccer or basketball highlight scene can be viewed from various angles, so that a user can be given a highly realistic feeling as compared with a normal video. Japanese Patent Laid-Open No. 2014-41259 (hereinafter referred to as D1) discloses a technique for generating a virtual viewpoint video from a plurality of images captured from multiple directions at the same time by a plurality of image capturing apparatuses installed so as to surround an object, and delivering the generated virtual viewpoint video to an external user terminal.

In the technique disclosed in D1, a delivery apparatus generates a virtual viewpoint video based on a virtual viewpoint position designated from a user terminal, and provides the virtual viewpoint video to the user terminal. Meanwhile, for example, when a virtual viewpoint video can be generated on the user terminal side, a method for delivering the virtual viewpoint video may be considered in which data for generating the virtual viewpoint video is transmitted from the delivery apparatus to the user terminal, and then the user terminal generates the virtual viewpoint video. With this configuration, although the processing load related to the generation of the virtual viewpoint video on the delivery apparatus side is reduced, the processing load on the user terminal side is increased. As described above, a plurality of types of virtual viewpoint video delivery methods can be considered, each of which has its own characteristics. D1 does not consider a method of determining how to deliver a virtual viewpoint video depending on the situation.

SUMMARY

One aspect of the present disclosure provides a technique for delivering virtual viewpoint video in an appropriate manner depending on the situation.

According to one aspect of the present disclosure, there is provided an information processing apparatus, comprising: one or more memories storing instructions; and one or more processors executing the instructions to: determine which of a first method for generating virtual viewpoint video upon receiving from an external apparatus object data used for generation of the virtual viewpoint video or a second method for receiving from the external apparatus virtual viewpoint video generated upon a virtual viewpoint designated for generation of the virtual viewpoint video to use as a delivery method for delivery of the virtual viewpoint video; and obtain the virtual viewpoint video by using the determined delivery method.

Further features of the present disclosure will become apparent from the following description of exemplary embodiments with reference to the attached drawings.

BRIEF DESCRIPTION OF THE DRAWINGS

FIG. 2 is a diagram for describing delivery methods according to the embodiment.

FIG. 3 is a diagram illustrating an example of positions of the virtual cameras and virtual viewpoint video according to the embodiment.

FIGS. 6A to 6C are diagrams exemplifying a delivery state and a state of generation of virtual viewpoint video in the video delivery apparatus.

FIGS. 7A to 7E are diagrams for describing position and orientation complementing of the virtual camera when switching the method of delivery.

DESCRIPTION OF THE EMBODIMENTS

Figure 1:
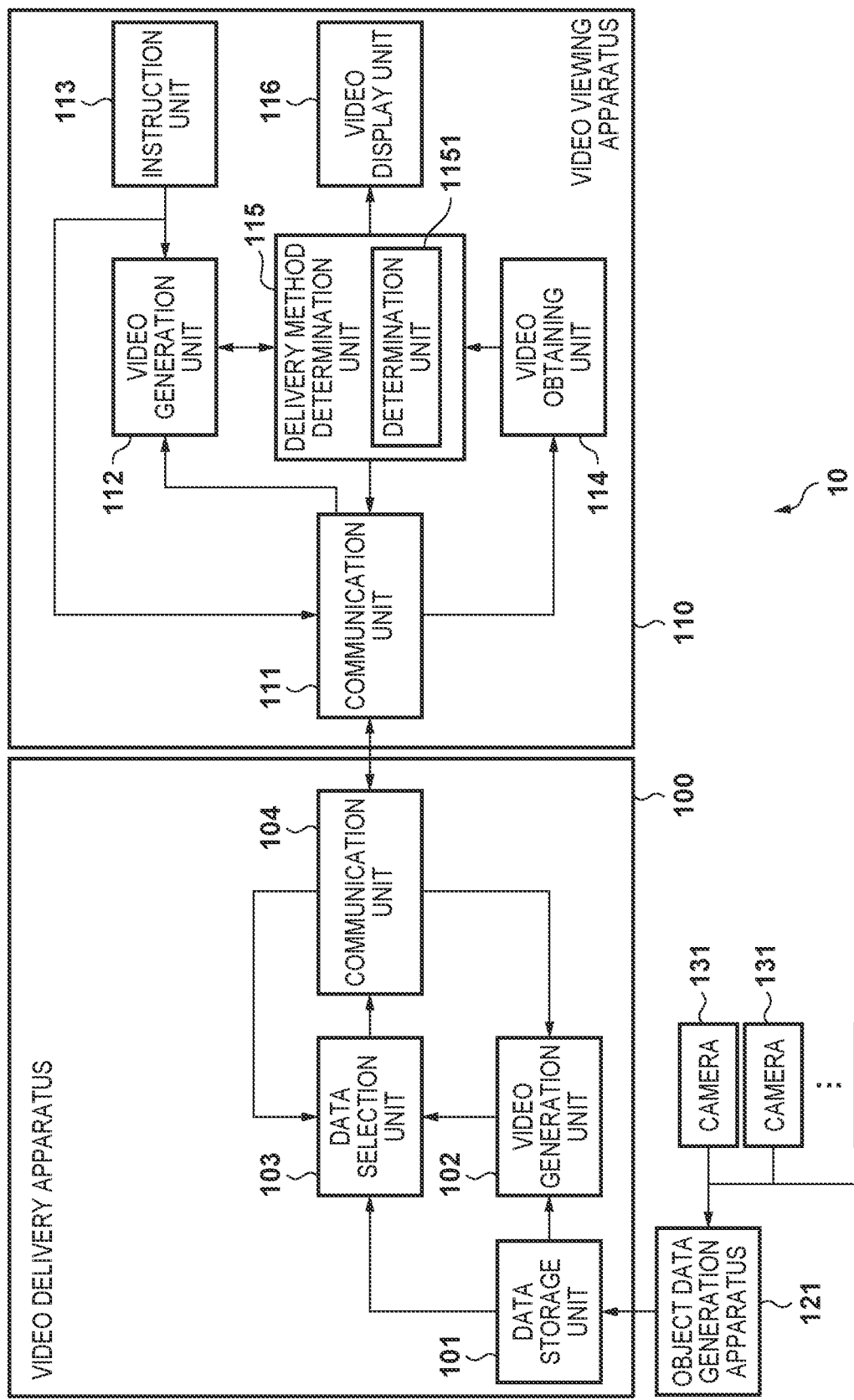
FIG. 1 is a block diagram illustrating an example of a configuration of a video display system according to an embodiment.

Hereinafter, embodiments will be described in detail with reference to the attached drawings. Note, the following embodiments are not intended to limit the scope of the disclosure. Multiple features are described in the embodiments, but limitation is not made to the disclosure that requires all such features, and multiple such features may be combined as appropriate. Furthermore, in the attached drawings, the same reference numerals are given to the same or similar configurations, and redundant description thereof is omitted.

FIG. 1 shows a configuration example of a video display system 10 related to the present embodiment. The video display system 10 includes a video delivery apparatus 100 and a video viewing apparatus 110. The video delivery apparatus 100 has a function of delivering three-dimensional shape information and texture information, which is necessary for generating a virtual viewpoint video, and delivering the virtual viewpoint video. Hereinafter, data necessary for generating a virtual viewpoint video, such as three-dimensional shape information and texture information, will be referred to as object data. The three-dimensional shape information is data representing a three-dimensional shape of an object, and may be, for example, point cloud data, polygon (mesh) data, or the like.

For example, the video delivery apparatus 100 may be implemented using a computer server (information processing apparatus) that provides services to users via a network, called a cloud. The video viewing apparatus 110 has a function of generating a virtual viewpoint video from the three-dimensional shape information and the texture information delivered by the video delivery apparatus 100, and enabling a user to view the virtual viewpoint video by visualizing the virtual viewpoint video; and a function of enabling a user to view the virtual viewpoint video delivered by the video delivery apparatus 100 by visualizing the virtual viewpoint video. In addition, the video viewing apparatus 110 has a function of accepting, from the user, designation of a virtual viewpoint position and a viewing direction from the virtual viewpoint, which are for generating the virtual viewpoint video. The video viewing apparatus 110 is, for example, an information processing apparatus such as a tablet or a personal computer. A user can designate a position of a virtual viewpoint and a viewing direction through a user interface that is displayed on the tablet, and can view the virtual viewpoint video observed from any viewpoint. The video delivery apparatus 100 and the video viewing apparatus 110 are connected by a network and can transmit and receive data over the network. Although FIG. 1 shows a configuration in which one video viewing apparatus 110 is connected to the video delivery apparatus 100, two or more video viewing apparatuses 110 may be connected to the video delivery apparatus 100.

The video delivery apparatus 100 includes a data storage unit 101, a video generation unit 102, a data selection unit 103, and a communication unit 104.

The data storage unit 101 stores three-dimensional shape information and texture information as object data. The three-dimensional shape information is generated from a video captured from multiple directions at the same timing using multiple cameras installed so as to surround the object. More specifically, the three-dimensional shape information is derived by, for example, extracting silhouette images of objects by separating objects and the background of the objects in the images captured by the plurality of cameras, and using a visual volume intersection method on the silhouette images of the plurality of different viewpoints. In the present embodiment, an object data generation apparatus 121 performs the above-described processing on a plurality of captured images captured by the plurality of cameras 131 and generates object data. The data storage unit 101 stores the three-dimensional shape information thus derived and object data including texture information obtained from the captured images. The video delivery apparatus 100 may have a function of the object data generation apparatus 121. The object data stored in the data storage unit 101 is not limited to a set of three-dimensional shape information and textures. The object data may be any data based upon which a virtual viewpoint video can be created, and may be, for example, colored point cloud data or the like. The object data may be billboard data or the like. In addition to the data described above, the object data may include data used for generating a virtual viewpoint video. For example, the object data may include background data or the like generated by CG. The data storage unit 101 can be realized by, for example, a storage such as an SSD, a hard disk, or the like.

The video generation unit 102 generates a virtual viewpoint video from object data (in this example, three-dimensional shape information and texture information) stored in the data storage unit 101. For example, the video generation unit 102 performs rendering processing using the set position of the virtual viewpoint, the viewing direction from the virtual viewpoint, the three-dimensional shape information, and the texture information to thereby generate a virtual viewpoint video. The video generation unit 102 may have a function of converting the generated virtual viewpoint video into compressed data that can be transmitted through a network. The video generation unit 102 outputs the generated virtual viewpoint video to the data selection unit 103.

The data selection unit 103 selects data to be transmitted to the video viewing apparatus 110 via the communication unit 104. Based on an instruction from the video viewing apparatus 110, the data selection unit 103 selects data to be transmitted to the video viewing apparatus 110 from the object data stored in the data storage unit 101 and the virtual viewpoint video generated by the video generation unit 102. When a plurality of video viewing apparatuses 110 are connected, the data selection unit 103 selects data to be transmitted to each of the video viewing apparatuses 110. The communication unit 104 transmits and receives data to and from the video viewing apparatus 110, which is an external apparatus, via a network. For example, the communication unit 104 communicates with external apparatuses according to a communication standard such as Ethernet.

Next, functional units of the video viewing apparatus 110 will be described. The video viewing apparatus 110 includes a communication unit 111, a video generation unit 112, an instruction unit 113, a video obtaining unit 114, a delivery method determination unit 115, and a video display unit 116.

The communication unit 111 transmits and receives data to and from the video delivery apparatus 100 via a network. For example, the communication unit 111 communicates according to a communication standard such as Ethernet. The video generation unit 112 generates a virtual viewpoint video based on object data (in this example, three-dimensional shape information and texture information) received from the video delivery apparatus 100 via the communication unit 111 and virtual viewpoint information provided from the instruction unit 113. In the following, the virtual viewpoint is referred to as the virtual camera, and the position of the virtual viewpoint and the viewing direction from the position are referred to as the position and orientation of the virtual camera. That is, the video generation unit 112 performs rendering processing based on three-dimensional shape information, texture information, and the position and orientation information of the virtual camera received from the video delivery apparatus 100, and generates a virtual viewpoint video. The video generation unit 112 outputs the generated virtual viewpoint video to the delivery method determination unit 115 as video data.

The instruction unit 113 receives a user operation for instructing the position and orientation of the virtual camera, provides the position and orientation instructed by the user to the video generation unit 112, and transmits the position and orientation to the video delivery apparatus 100 via the communication unit 111. For example, the instruction unit 113 displays a user interface for instructing the position and orientation of the virtual camera on the tablet screen, accepts the designation of the position and orientation by the user, and supplies the content thereof to the video generation unit 112 and the communication unit 111. Incidentally, when the video viewing apparatus 110 is a personal computer or the like, the instruction unit 113 may be an input apparatus composed of a lever and a switch for designating the position of the virtual viewpoint camera. The video obtaining unit 114 converts the virtual viewpoint video (the virtual viewpoint video generated by the video generation unit 102) received from the video delivery apparatus 100 via the communication unit 111 into video data that can be displayed by the video display unit 116. For example, when the received virtual viewpoint video is compressed video data, the video obtaining unit 114 has a function of decompressing the compressed video data.

The delivery method determination unit 115 determines a delivery method to be used from among a plurality of delivery methods for viewing a virtual viewpoint video, and notifies the video delivery apparatus 100 of the determined delivery method. The determination unit 1151 determines whether or not the video generation unit 112 can generate the virtual viewpoint video at a predetermined frame rate based on the state of reception of object data by the communication unit 111 or the state of generation of virtual viewpoint video by the video generation unit 112. Based on the determination result, the delivery method determination unit 115 determines whether to use a delivery method for obtaining a virtual viewpoint video from the video generation unit 112 or to use a delivery method for obtaining a virtual viewpoint video from the video delivery apparatus 100 (video obtaining unit 114), and determines the delivery method to be used. The delivery method determination unit 115 selects either video data generated by the video generation unit 112 or video data obtained by the video obtaining unit 114 based on the determined delivery method, and outputs the selected video data to the video display unit 116. The plurality of delivery methods used in the present embodiment and the processing by which the delivery method determination unit 115 determines the delivery method will be described later. The video display unit 116 displays the video data output from the delivery method determination unit 115 (virtual viewpoint video), for example, on a display such as a liquid crystal display. As a result, the user can view the virtual viewpoint video selected and outputted by the delivery method determination unit 115.

Figure 10:
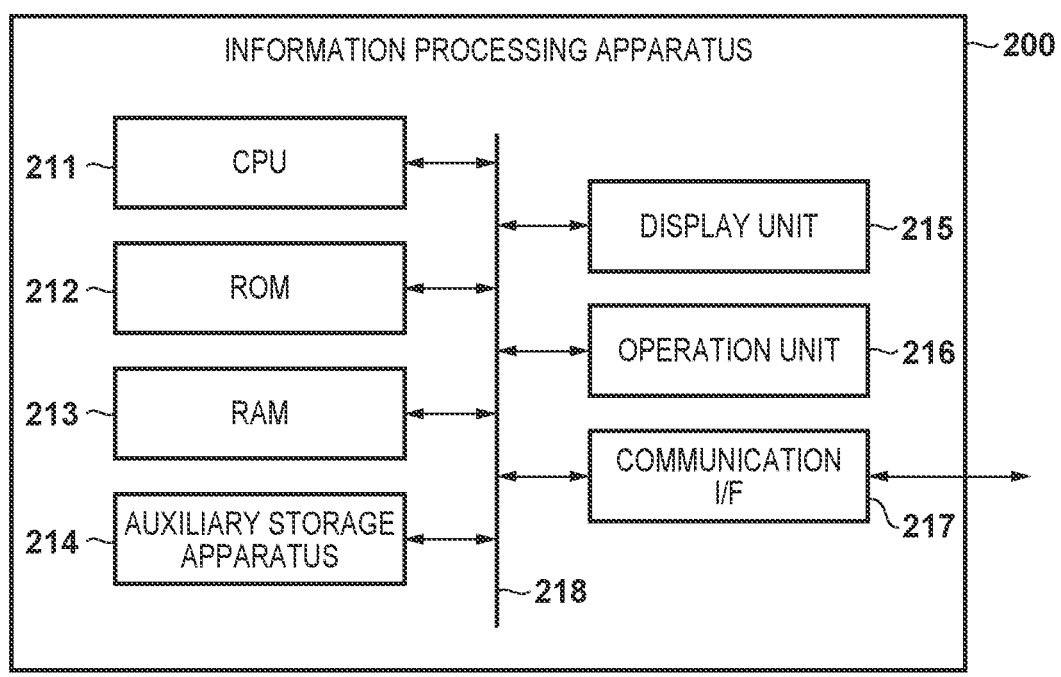
FIG. 10 is a block diagram illustrating an example of a hardware configuration of a video viewing apparatus and a video delivery apparatus.

The hardware configurations of the video delivery apparatus 100 and the video viewing apparatus 110 will be described with reference to FIG. 10. The video delivery apparatus 100 and the video viewing apparatus 110 can each be realized by an information processing apparatus 200 having a configuration as shown in FIG. 10. The information processing apparatus 200 includes a central processing unit (CPU) 211, a read-only memory (ROM) 212, a random access memory (RAM) 213, an auxiliary storage apparatus 214, a display unit 215, an operation unit 216, a communication I/F 217, and a bus 218.

The CPU 211 controls the entire information processing apparatus 200 using a computer program and data stored in the ROM 212 or the RAM 213 to realize the functions of the video delivery apparatus 100 or the video viewing apparatus 110 shown in FIG. 1. Note that the information processing apparatus 200 may have one or more dedicated hardware devices other than the CPU 211, and at least a part of the processing by the CPU 211 may be executed by the dedicated hardware. Examples of dedicated hardware include Application Specific Integrated Circuits (ASICs), Field Programmable Gate Arrays (FPGAs), and Digital Signal Processors (DSPs). The ROM 212 stores programs that do not need to be changed. The RAM 213 temporarily stores programs and data supplied from the auxiliary storage apparatus 214 and data supplied from the outside through the communication I/F 217. The auxiliary storage apparatus 214 is configured by, for example, a hard disk drive and stores various kinds of data such as image data and voice data.

The display unit 215 includes, for example, a liquid crystal display, LEDs, and the like, and displays a GUI (Graphical User Interface) for the user to operate the information processing apparatus 200. The operation unit 216 includes, for example, a keyboard, a mouse, a joystick, a touch panel, and the like, and inputs various instructions to the CPU 211 in response to operations by the user. The communication I/F 217 is used for communication with an apparatus external to the information processing apparatus 200. For example, when the information processing apparatus 200 is connected to an external apparatus by wire, a communication cable is connected to the communication I/F 217. When the information processing apparatus 200 has a function of wirelessly communicating with an external apparatus, the communication I/F 217 includes an antenna. The bus 218 connects the respective units of the information processing apparatus 200 to transmit information.

In the present embodiment, it is assumed that the display unit 215 and the operation unit 216 exist inside the information processing apparatus 200, but at least one of the display unit 215 and the operation unit 216 may exist outside the information processing apparatus 200 as another apparatus. In this instance, the CPU 211 may operate as a display control unit that controls the display unit 215 and an operation control unit that controls the operation unit 216.

Next, an example of a plurality of delivery methods will be described. FIG. 2 shows an example of delivery methods used by the video display system 10 according to the present embodiment. In this embodiment, the three delivery methods A to C shown in FIG. 2 are used selectively. The rows of "communication data" indicate, for each of the delivery methods A to C, data transmitted from the video delivery apparatus 100 to the video viewing apparatus 110 in downloading and data transmitted from the video viewing apparatus 110 to the video delivery apparatus 100 in uploading. The row of "Apparatus for generating displayed video" indicates which of the video delivery apparatus 100 and the video viewing apparatus 110 virtual viewpoint video to display is generated in for each of the delivery methods A to C. The rows of "virtual camera operability" indicate the latency (trackability of operations on the virtual camera) and the positions that can be designated (virtual camera positions for which operation by the user is possible) for each of the delivery methods A to C. The rows of "communication band" indicate the communication band required at the time of download and the communication band required at the time of upload in each of the delivery methods A to C. "Processing load of video viewing apparatus" indicates the magnitude of the processing load of the video viewing apparatus 110 in each of the delivery methods A to C. "Processing load of video delivery apparatus" indicates the magnitude of the processing load of the video delivery apparatus 100 in each of the delivery methods A to C.

In delivery method A, the video delivery apparatus 100 delivers object data (three-dimensional shape information and texture information in the present embodiment) to the video viewing apparatus 110. Note that the video viewing apparatus 110 can designate the time of the frame corresponding to the object data delivered by the video delivery apparatus 100 (hereinafter referred to as the event time). The video delivery apparatus 100 delivers the object data to the video viewing apparatus 110 with a frame of the event time designated by the video viewing apparatus 110 at the beginning. The video viewing apparatus 110 (the video generation unit 112) performs rendering of the virtual viewpoint video based on the object data received from the video delivery apparatus 100 and position and orientation information of the virtual camera inputted by the user via the instruction unit 113. In delivery method A, since the video generation unit 112 of the video viewing apparatus 110 generates the virtual viewpoint video, it is possible to generate the virtual viewpoint video with low delay in response to an instruction from the user (the instruction unit 113). Therefore, the user gets a user experience in which the virtual viewpoint video changes with a good response to the operation of the virtual camera. Meanwhile, the video delivery apparatus 100 may transmit to the video viewing apparatus 110 three-dimensional shape information in which the amount of data is several times to several tens of times larger than that of two-dimensional video data. Therefore, a large communication band (e.g., 1 Gbps in the example of FIG. 2) needs to be secured between the video delivery apparatus 100 and the video viewing apparatus 110. Furthermore, the video viewing apparatus 110 needs the ability to render the delivered object data (three-dimensional shape information and texture information) in real time.

In delivery method B, the video delivery apparatus 100 generates a virtual viewpoint video (two-dimensional video data) from the position and orientation of the virtual camera designated by the video viewing apparatus 110 and the object data stored in the data storage unit 101. The video delivery apparatus 100 generates virtual viewpoint video frames starting at the event time designated by the video viewing apparatus 110 and delivers the generated virtual viewpoint video to the video viewing apparatus 110. Here, the position and orientation of the virtual camera and the event time are inputted by the user from the instruction unit 113, and are transmitted to the video delivery apparatus 100 via the communication unit 111. In delivery method B, information on the position and orientation of the virtual camera needs to be transmitted to the video delivery apparatus 100 via the network. Therefore, as compared with delivery method A, a delay may occur between the users virtual camera operation and the display of the virtual viewpoint video reflecting the operation. However, since delivery method B delivers the two-dimensional video data generated by the video delivery apparatus 100, it is not necessary to deliver object data including the three-dimensional shape information and the texture information having a large amount of data, and not as large a communication band is needed compared to delivery method A. However, since the video delivery apparatus 100 needs to perform rendering for each position and orientation of the virtual camera designated by the user, high processing performance is required in the video generation unit 102 of the video delivery apparatus 100.

In delivery method C, the video delivery apparatus 100 generates a virtual viewpoint video based on the position and orientation of a plurality of virtual cameras determined in advance, and delivers the virtual viewpoint video (two-dimensional video data) according to a virtual camera designated by the video viewing apparatus 110 among the plurality of virtual cameras. In delivery method C, since the virtual viewpoint video generated by the video delivery apparatus 100 is delivered to one or more video viewing apparatuses, the individual video viewing apparatuses 110 cannot designate the event time. FIG. 3 shows an example of virtual viewpoint video generated by the video delivery apparatus 100 for delivery method B and delivery method C. In the example of FIG. 3, a virtual viewpoint video of a soccer shot in a stadium is shown. The data storage unit 101 of the video delivery apparatus 100 stores object data (three-dimensional shape information and texture information) of a stadium 301, a player 302, and a ball 303 shown in FIG. 3. In delivery method B, the video generation unit 102 generates and delivers a virtual viewpoint video 351 based on the position and orientation of a virtual camera 350 set by instruction from the video viewing apparatus 110 and the object data stored in the data storage unit 101. In delivery method C, the video generation unit 102 of the video delivery apparatus 100 reads the object data from the data storage unit 101 and generates a virtual viewpoint video based on the predetermined position and orientation of the virtual camera. In the present embodiment, the positions and orientations of virtual cameras 310, 320, 330, and 340 are determined in advance as shown in FIG. 3. Virtual viewpoint videos 311, 321, 331, and 341 are virtual viewpoint videos generated by the video generation unit 102 based on the position and orientation of the virtual cameras 310, 320, 330, and 340, respectively.

In delivery method C, the user selects a virtual camera having a desired position and orientation from the previously-described four virtual cameras 310, 320, 330, and 340 by using the instruction unit 113. In delivery method A and delivery method B, an arbitrary position and orientation of the virtual camera and the event time can be selected, whereas in delivery method C, a position and orientation of the virtual camera determined in advance is selected. In delivery method C, by fixing the position of the virtual camera, it is possible to cope with an increase in the number of users without increasing the processing load of the video delivery apparatus 100 (the video generation unit 102).

Figure 4A:
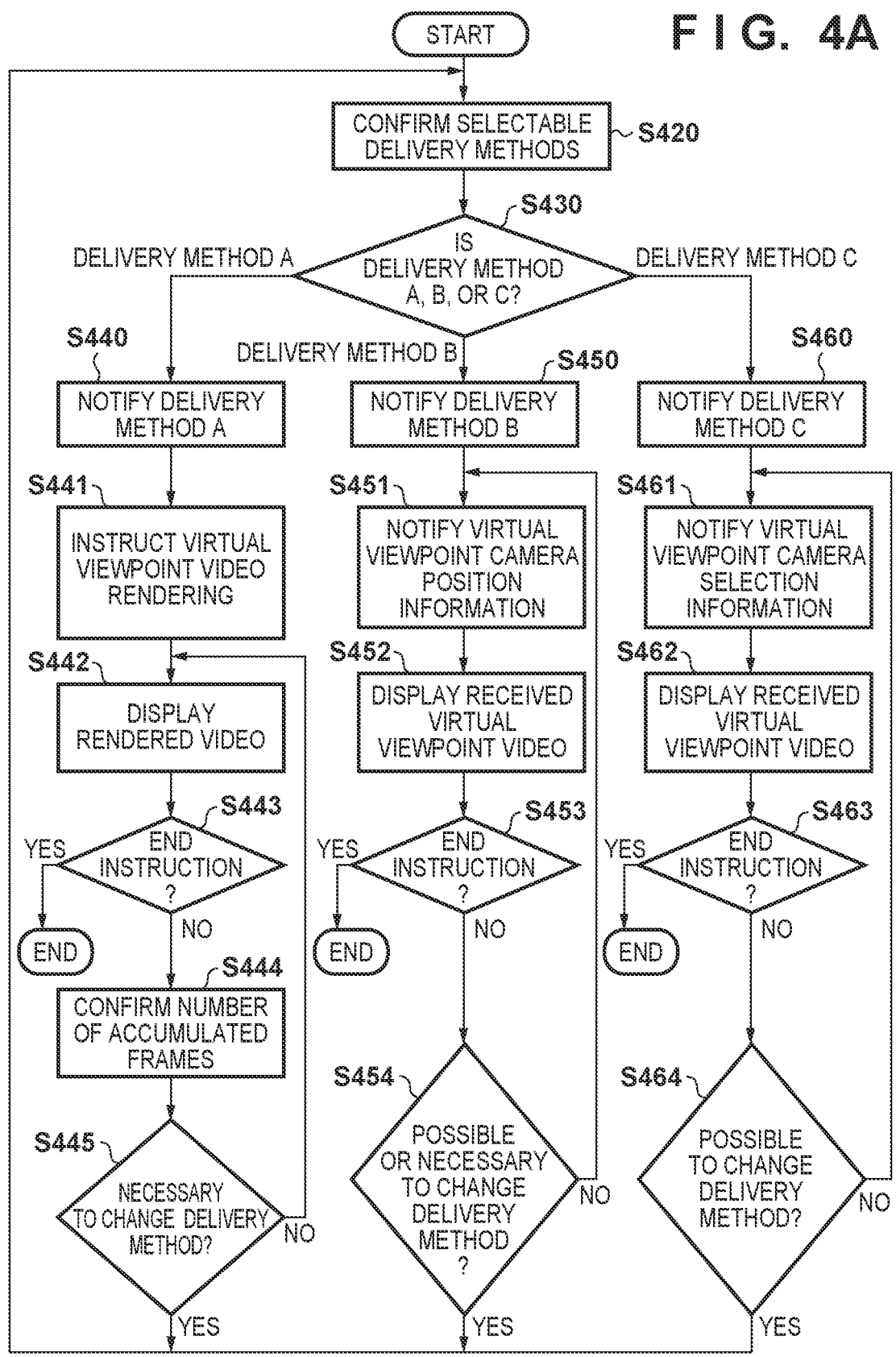
FIG. 4A is a flowchart illustrating processing of a video viewing apparatus according to the embodiment.
Figure 4B:
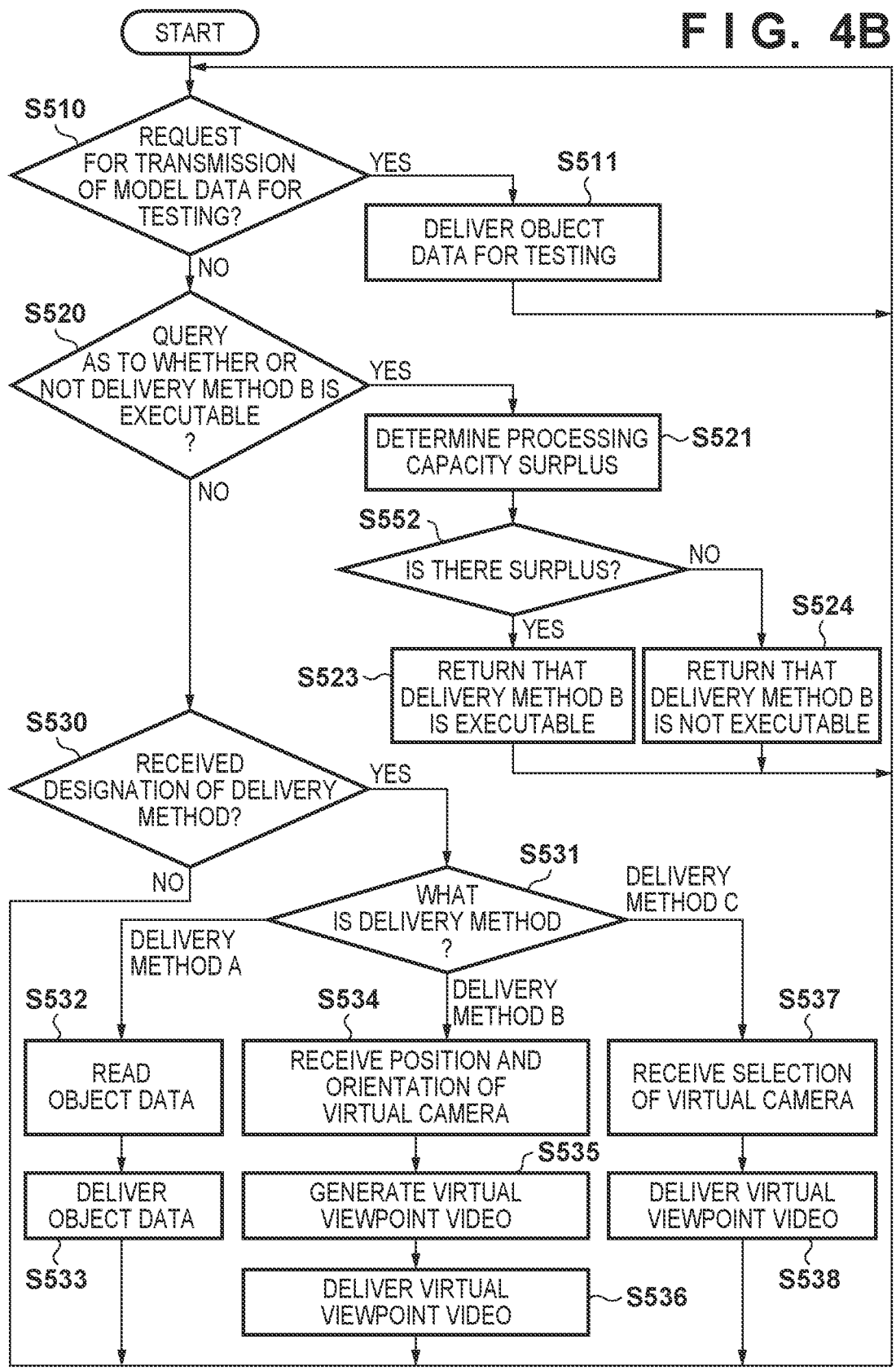
FIG. 4B is a flowchart illustrating processing of a video delivery apparatus according to the embodiment.

Next, processing for determining a delivery method by the delivery method determination unit 115 and processing for displaying a virtual viewpoint video in each delivery method will be described. FIG. 4A is a flowchart showing a process of displaying a virtual viewpoint video by the video viewing apparatus 110. In the present embodiment, the delivery method used for the display of the virtual viewpoint video by the video viewing apparatus 110 is determined from among the three delivery methods described above. Further, the operation of the video delivery apparatus 100 in response to various requests from the video viewing apparatus 110 is shown in the flowchart of FIG. 4B.

In step S420, the delivery method determination unit 115 confirms whether or not each of the delivery methods A to C can be selected. As described above, delivery method A is determined to be selectable when there is a communication band sufficient for communication with the video delivery apparatus 100 and the video generation unit 112 has sufficient rendering performance. The presence of a sufficient communication band can be confirmed, for example, by using object data for testing (three-dimensional shape information and texture information) as follows. When the delivery method determination unit 115 requests the video delivery apparatus 100 to transmit object data for testing, the video delivery apparatus 100 delivers the object data for testing to the requesting video delivery apparatus 100 (YES in step S510, step S511). When the object data for testing is received by the video viewing apparatus 110, the video generation unit 112 generates a virtual viewpoint video based on the object data for testing. The delivery method determination unit 115 (the determination unit 1151) confirms whether the video generation unit 112 can output a virtual viewpoint video based on the object data for testing at a desired frame rate. The position and orientation of the virtual camera used at this time may be a preset position and orientation, or may be a position and orientation designated by a user operation at that time. If the video generation unit 112 can output the virtual viewpoint video at the desired frame rate, the determination unit 1151 determines that the virtual viewpoint video by the video generation unit 112 can be used, and the delivery method determination unit 115 determines that delivery method A can be selected according to the determination result.

Whether or not to select delivery method B is determined, for example, by confirming whether or not the video generation unit 102 of the video delivery apparatus 100 has a surplus of processing capacity. For example, in step S420, the delivery method determination unit 115 queries the video delivery apparatus 100 as to whether or not the delivery of the virtual viewpoint video by delivery method B is possible. Upon receiving this query, the video generation unit 102 determines whether or not there is a surplus of processing capacity (YES in step S520, step S521). For example, an upper limit on the number of virtual viewpoint videos that can be generated is set in advance in the video generation unit 102, and the video generation unit 102 determines whether or not there is a surplus of processing capacity based on whether or not the number of virtual viewpoint videos that are currently generated has reached the upper limit. The video generation unit 102 determines that there is no surplus if the number of generated virtual viewpoint videos has reached the upper limit, and otherwise determines that there is a surplus. The detail will be described later with reference to FIGS. 6A to 6C. If it is determined that there is a surplus (YES in step S522), the video delivery apparatus 100 returns to the video viewing apparatus 110 that delivery method B can be executed (step S523). Meanwhile, if it is determined that there is not a surplus (NO in step S522), the video delivery apparatus 100 returns to the video viewing apparatus 110 that delivery method B cannot be executed (step S524). However, the method of confirming the surplus of processing capacity of the video generation unit 102 is not limited to this, and for example, the surplus of processing capacity may be confirmed based on the storage, the memory, and the CPU operation rate of the video generation unit 102.

In delivery method C, since the video generation unit 102 generates a virtual viewpoint video based on a predetermined virtual camera position, the processing load and the communication load are substantially constant. Therefore, delivery method C is always selectable when delivery methods A and B are not selectable. First, the following processing will be described assuming that it is confirmed that all of the delivery methods A, B. and C are selectable.

In step S430, the delivery method determination unit 115 determines a delivery method to be used from among the delivery methods confirmed to be selectable in step S420. In this example, the delivery method is determined in the order of priority of delivery method A, then delivery method B, and then delivery method C. Therefore, when all of delivery methods A to C can be selected, the delivery method determination unit 115 selects delivery method A. In delivery method A, the user can operate the position of the virtual camera with good response. In the present embodiment, an example in which the delivery method determination unit 115 determines the delivery method has been described, but the present disclosure is not limited thereto. For example, a list of delivery methods confirmed to be selectable may be displayed, and a user may select a desired delivery method from the list. When the delivery method determination unit 115 selects delivery method A, the process transitions to step S440.

In step S440, the delivery method determination unit 115 notifies the data selection unit 103 of the video delivery apparatus 100 that the selected delivery method is delivery method A, via the communication unit 111 and the communication unit 104. The data selection unit 103, after receiving the notification from the video viewing apparatus 110 that delivery method A has been selected (step S530, step S531), reads object data stored in the data storage unit 101 (step S532), and transmits the object data to the video viewing apparatus 110 via the communication unit 104 (step S533). The communication unit 111 supplies the object data received from the video delivery apparatus 100 to the video generation unit 112. When the event time is designated from the video viewing apparatus 110 to the video delivery apparatus 100, the video delivery apparatus 100 transmits to the video viewing apparatus 110 object data corresponding to frames from the designated event time. Next, in step S441, the delivery method determination unit 115 instructs the video generation unit 112 to generate a virtual viewpoint video. The video generation unit 112 performs rendering using the position and orientation of the virtual camera designated by the user from the instruction unit 113 and the object data received from the video delivery apparatus 100, and generates a virtual viewpoint video. Next, in step S442, the video display unit 116 displays the virtual viewpoint video generated by the video generation unit 112 on a display device (the display unit 215). The user can view the virtual viewpoint video of the virtual camera instructed from the instruction unit 113.

In step S443, the delivery method determination unit 115 confirms whether or not there is an instruction from the user to end viewing of the virtual viewpoint video. If there is a termination process (YES in step S443), the viewing of the virtual viewpoint video in the video viewing apparatus 110 is completed, and this process is terminated. On the other hand, if there is no termination process from the user (NO in step S443), the process transitions to step S444.

In step S444, the delivery method determination unit 115 confirms the number of frames of the virtual viewpoint video generated and outputted by the video generation unit 112 that have not yet been displayed by the video display unit 116 (hereinafter, number of accumulated frames). The video display unit 116 displays a virtual viewpoint video at a predetermined frame rate, for example, 30 fps (30 frames per second). The video generation unit 112 can generate 30 or more frames per second as long as a sufficient communication band is secured and data that takes a very long time to render is not received. Meanwhile, when the number of frames that can be generated by the video generation unit 112 per time vanes due to change in the communication band of the communication unit 111 and the processing load of the video generation unit 112, the number of accumulated frames also increases or decreases. In the present embodiment, this number of accumulated frames is used for judging whether or not delivery method A can be selected.

Figure 5:
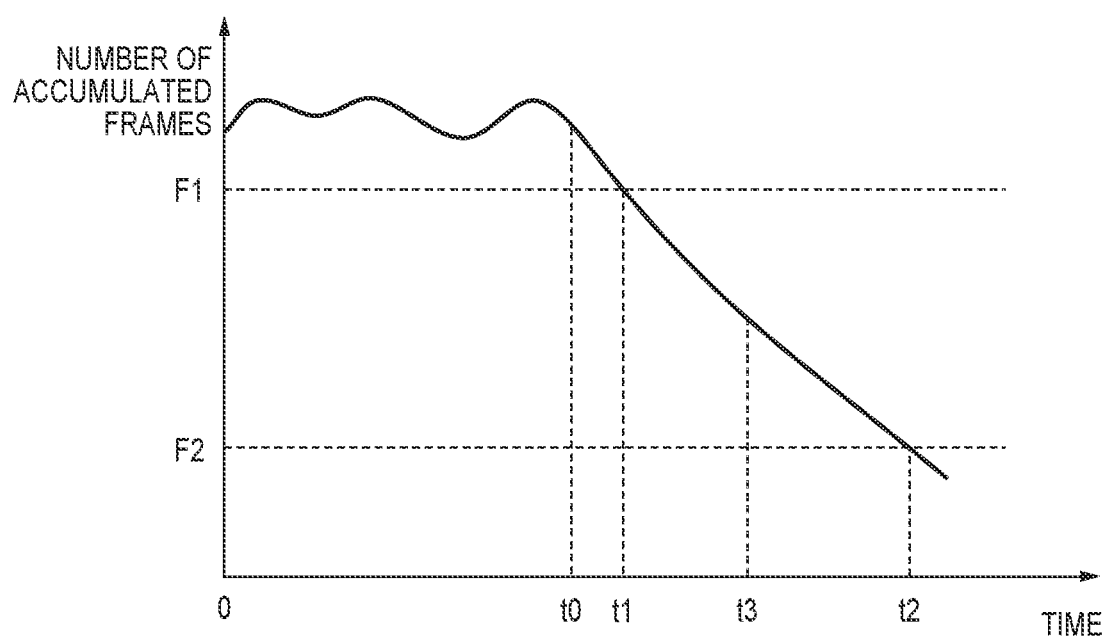
FIG. 5 is a diagram illustrating an example of variation in a number of accumulated frames in the video viewing apparatus.

In step S445, the delivery method determination unit 115 determines whether or not the delivery method needs to be changed based on the number of accumulated frames confirmed in step S444. FIG. 5 shows an example of a transition of the number of accumulated frames. In FIG. 5, the horizontal axis represents time and the vertical axis represents the number of accumulated frames. The delivery method determination unit 115 determines that switching from delivery method A to another delivery method is necessary when the number of accumulated frames becomes equal to or less than the threshold F2. In the example of FIG. 5, a sufficient communication band is secured from time 0 to t0, and the video generation unit 112 generates a virtual viewpoint video of 30 frames or more per second. It is assumed that the communication band decreases from time t0 and the number of frames generated by the video generation unit 112 becomes 30 frames or less per second. Therefore, the number of accumulated frames gradually decreases from the time t0, and reaches the threshold F2 at the time t2. The delivery method determination unit 115 determines that it is necessary to change delivery method at the time t2 when the number of accumulated frames reaches the threshold F2. If it is determined that the delivery method needs to be changed (YES in step S445), the process returns to step S420. On the other hand, when it is determined that the delivery method does not need to be changed (NO in step S445), the process returns to step S442, and the virtual viewpoint video continues to be reproduced by delivery method A.

In the above description, the delivery method determination unit 115 decides to switch the delivery method, but the user may be prompted to change the delivery method or a confirmation may be made with the user about changing the delivery method. For example, as shown in FIG. 5, at a time point (t1) when the number of accumulated frames becomes equal to or less than the threshold value F1, the delivery method determination unit 115 displays on the video display unit 116 a prompt to the user to change the delivery method. When the user instructs that the delivery method be changed to a delivery method other than delivery method A, the delivery method determination unit 115 determines to change the delivery method in step S445 (YES in step S445), and the process returns to step S420.

When the process returns to step S420, the delivery method determination unit 115 confirms the selectable delivery method as described above. When it is determined in step S445 that a change to another delivery method is required, delivery method A is selected, and the number of accumulated frames is lower than the threshold. Therefore, the delivery method determination unit 115 determines that delivery method A is not selectable. Regarding delivery method B, the delivery method determination unit 115 confirms whether or not there is a surplus of the processing capacity of the video generation unit 102 of the video delivery apparatus 100 via the communication unit 111.

Figure 6C:
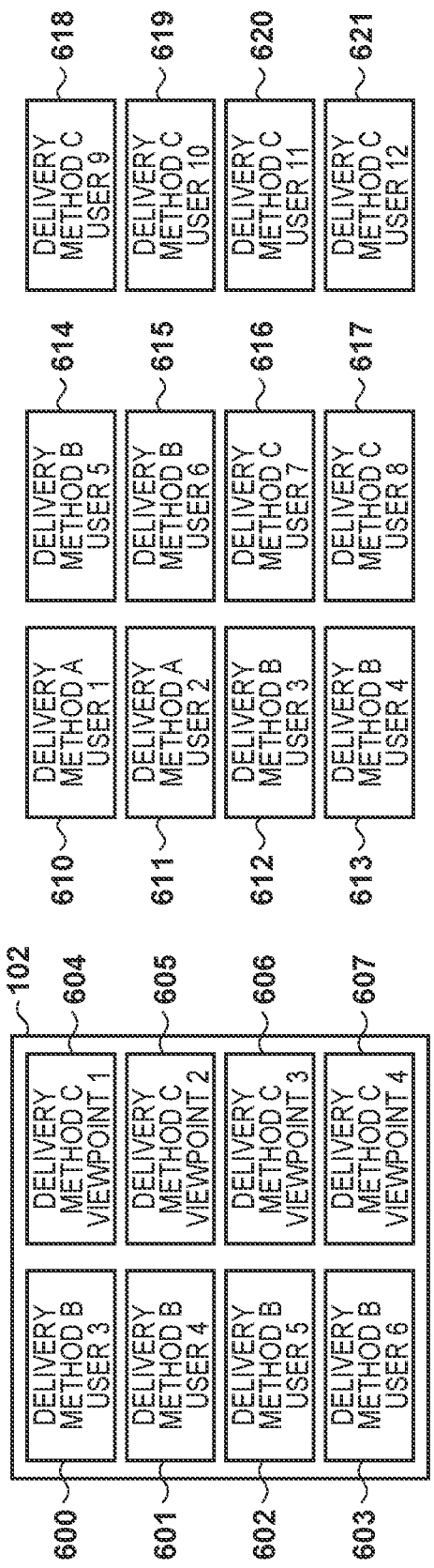

FIGS. 6A to 6C show an exemplary processing state of the video generation unit 102 of the video delivery apparatus 100. It is assumed that the video generation unit 102 can generate eight virtual viewpoint videos at the same time. FIGS. 6A to 6C illustrate eight virtual viewpoint video generation processes 600 to 607 that can be executed simultaneously. However, in the present embodiment, in order to make delivery method C always selectable, the generation processes 604 to 607 are reserved for generating the virtual viewpoint video of the virtual cameras 310, 320, 330, and 340, and it is assumed that only the generation processes 600 to 603 can be used in delivery method B. That is, the generation processes 604 to 607 are reserved for the virtual viewpoint video generation by delivery method C, and cannot be used for delivery method B. For example, in FIG. 6A, generation processes 600 to 602 are currently performing processing for delivery method B for users 3 to 5. Further, it is assumed that the generation process 603 is yet to be executed and is in a state in which a processing request therefor can be accepted. The delivery processes 610 to 614 represent delivery processes executed in response to requests from a plurality of video viewing apparatuses 110. For example, the delivery process 610 indicates a delivery process for the user 1 viewing by delivery method A. Since the user 1 is viewing by delivery method A, the video generation unit 102 does not perform the generation processing for the delivery process 610. The delivery process 612 is a delivery process for the user 3 viewing in delivery method B, and the virtual viewpoint video generation process 600 is performed by the video generation unit 102. Similarly, generation processes 601 and 602 are performed for delivery processes 613 to 614. In FIG. 6A, the video generation unit 102 executes generation processes 600, 601, and 602 for delivering three virtual viewpoint videos of the users 3, 4, and 5.

Assume that it becomes difficult to continue viewing by delivery method A in the video viewing apparatus 110 of the user 1 who is viewing by delivery method A in the state of FIG. 6A, and the delivery method determination unit 115 confirms with the video delivery apparatus 100 whether or not delivery method B is possible. In the state of FIG. 6A, there is an unused generation process 603 in the video generation unit 102. That is, the delivery method determination unit 115 is notified that a new generation process can be executed by the video generation unit 102 (there is a surplus of processing capacity) and delivery method B can be selected.

If it is confirmed in step S420 that delivery method A is not selectable but delivery method B is selectable, in step S430, the delivery method determination unit 115 determines to use delivery method B. Therefore, the process transitions to step S450. In step S450, the delivery method determination unit 115 notifies the data selection unit 103 of the use of delivery method B via the communication unit 111 and the communication unit 104. Upon receiving the notification of delivery method B, the data selection unit 103 requests the video generation unit 102 to generate a virtual viewpoint video. The video generation unit 102, after receiving the request, starts generating a virtual viewpoint video using the position and orientation of the virtual camera received from the video viewing apparatus 110 (step S530, step S531, and step S534 to step S536). As a result, for example, as shown in FIG. 6B, the generation process 603 of the video generation unit 102 starts generation of the virtual viewpoint video for the delivery process 610 of the user 1.

In step S451, the information of the position and orientation of the virtual camera inputted by the user through the instruction unit 113 is transmitted to the video generation unit 102 of the video delivery apparatus 100 via the communication unit 111. The video generation unit 102 receives the position and orientation of the virtual camera (step S534), and generates the virtual viewpoint video based on the object data read from the data storage unit 101 and the received virtual viewpoint camera position and orientation (step S535, generation process 603 of FIG. 6B). The data selection unit 103 delivers the virtual viewpoint video generated by the video generation unit 102 to the video viewing apparatus 110 via the communication unit 104 (step S536, the delivery process 610 of FIG. 6B). Since the virtual viewpoint video to be transmitted is two-dimensional video data, the data selection unit 103 may perform moving image compression processing to reduce the amount of data before transmitting the video.

In step S452, the video obtaining unit 114 performs decompression processing on the compressed virtual viewpoint video to generate a two-dimensional image and inputs it to the delivery method determination unit 115. Since delivery method B is selected, the delivery method determination unit 115 supplies the virtual viewpoint video input from the video obtaining unit 114 to the video display unit 116, and the video display unit 116 displays the video on a display device (the display unit 215). Thus, in delivery method B, the virtual viewpoint video generated by the video generation unit 102 of the video delivery apparatus 100 based on the virtual camera position and orientation instructed by the instruction unit 113 can be viewed by the user in the video viewing apparatus 110. In delivery method B, the virtual viewpoint video at the designated event time can be viewed by designating the event time from the video viewing apparatus 110 to the video delivery apparatus 100, as described above.

In step S453, the delivery method determination unit 115 confirms whether or not there is an instruction from the user to end viewing of the virtual viewpoint video. If there is a termination process (YES in step S453), the viewing of the virtual viewpoint video in the video viewing apparatus 110 is completed, and this process is terminated. On the other hand, if there is no termination process from the user (NO in step S453), the process transitions to step S454.

In step S454, the delivery method determination unit 115 determines whether or not delivery method B needs to be changed to delivery method C, and whether or not delivery method B can be changed to delivery method A. The delivery method determination unit 115 determines that it is difficult to maintain delivery method B, for example, when the processing load of the video generation unit 102 becomes high and the generation of the virtual viewpoint video cannot be continued, or when the delay in response to a virtual camera position and orientation instruction from the user is large and the operability is suffering. The fact that the video generation unit 102 cannot continue the generation of the virtual viewpoint video may be notified from the video delivery apparatus 100, or may be determined by the delivery method determination unit 115 from a decrease in the frame rate of the received virtual viewpoint video. The delivery method determination unit 115 can obtain the magnitude of the delay in response to the virtual camera position and orientation instruction by, for example, confirming the delay when the video delivery apparatus 100 adds virtual camera position and orientation information to the virtual viewpoint video and delivers the video. In addition, in order to determine whether or not a change to delivery method A is possible, the delivery method determination unit 115 causes the video delivery apparatus 100 to deliver, for example, three-dimensional shape information and texture information for testing (hereinafter, referred to as test data). The delivery method determination unit 115 causes the video generation unit 112 to generate a virtual viewpoint video from the test data, and determines that delivery method A is selectable when the number of accumulated frames is equal to or greater than a threshold value (e.g., equal to or greater than a threshold value F1). If it is determined that a change to delivery method C is required or a change to delivery method A is possible (YES in step S454), the process returns to step S420. Otherwise (NO in step S454), the process returns to step S451 and the reproduction of the virtual viewpoint video using delivery method B is continued.

The case where the delivery method determination unit 115 switches from delivery method A to delivery method B has been described above. Next, the processing in the case of switching from delivery method A to delivery method C will be described.

As described above, when YES is determined in step S454, the process returns to step S420, and the delivery method determination unit 115 confirms the selectable delivery method. At this time, it is determined that the video viewing apparatus 110 is still unable to employ delivery by delivery method A, and the processing state of the video generation unit 102 of the video delivery apparatus 100 is as shown in FIG. 6C. In the state of FIG. 6C, delivery processes 615 to 621 are added to the state of FIG. 6A, and the video generation unit 102 of the video delivery apparatus 100 executes four generation processes 600 to 603 for delivery method B and four generation processes 604 to 607 for delivery method C. In delivery method C, the generation of the virtual viewpoint video corresponding to the four virtual cameras 310, 320, 330, and 340 (FIG. 3) in which the position and orientation is determined in advance is performed in the four generation processes 604 to 607. The delivery processes 616 to 621 deliver the virtual viewpoint video to the video viewing apparatuses 110 of the respective users 7 to 12 by using delivery method C. In such a situation, when it is confirmed by the delivery method determination unit 115 whether or not delivery method B is executable, it is determined that delivery method B cannot be selected because the video generation unit 102 cannot accept further generation processes. As a result, the delivery method determination unit 115 determines that only delivery method C can be selected. In step S430, the delivery method determination unit 115 selects delivery method C, and the process transitions to step S460.

In step S460, the delivery method determination unit 115 notifies the data selection unit 103 of the video delivery apparatus 100 that delivery method C has been selected. In step S461, the delivery method determination unit 115 sends the virtual camera selection information inputted by the user through the instruction unit 113 to the video generation unit 102 of the video delivery apparatus 100. In delivery method C of the present embodiment, one of the previously-described four predetermined virtual cameras 310, 320, 330, and 340 is selected. When delivery method C is designated, the data selection unit 103 receives the selection information from the video viewing apparatus 110 (step S530, step S531, and step S537). Next, the data selection unit 103 delivers the virtual viewpoint video corresponding to the position and orientation of the virtual camera selected in the received selection information to the video viewing apparatus 110 from which the selection information was transmitted (step S538).

In step S462, the video obtaining unit 114 performs decompression processing or the like on the virtual viewpoint video received via the communication unit 111, and supplies the obtained virtual viewpoint video to the delivery method determination unit 115. The delivery method determination unit 115 selects the virtual viewpoint video supplied from the video obtaining unit 114, and displays it to the user via the video display unit 116. By using delivery method C in this manner, delivery can be continued while the processing load on the video generation unit 102 of the video delivery apparatus 100 is kept within a predetermined range, even if the number of viewing users increases as shown in FIG. 6C.

In step S463, the delivery method determination unit 115 confirms whether or not there is an instruction from the user to end viewing of the virtual viewpoint video. If there is a termination process (YES in step S463), the viewing of the virtual viewpoint video in the video viewing apparatus 110 is completed, and this process is terminated. On the other hand, if there is no termination process from the user (NO in step S463), the process transitions to step S464.

In step S464, the delivery method determination unit 115 determines whether or not delivery method can be changed. In delivery method C, since the configuration is basically the same as that of general two-dimensional video delivery, there is no case where the virtual viewpoint video cannot be viewed. That is, no further changes to delivery method are required. However, in delivery method C, the operability of the virtual camera is limited as compared with delivery method A and delivery method B. Therefore, in step S464, it is confirmed whether or not delivery method C can be changed to delivery method A or delivery method B. The possibility of the change to delivery method A can be determined by, for example, the method using the test data described above. Whether or not the delivery method can be changed to delivery method B can be determined by querying whether or not there is surplus processing capacity of the video generation unit 102 (for example, whether or not any of the generation processes 600 to 607 are unused). If it is determined that a change to delivery method A or delivery method B is possible (YES in step S464), the process returns to step S420. Otherwise (NO in step S464), the process returns to step S461 and the reproduction of the virtual viewpoint video using delivery method C is continued.

In the present embodiment, positions of the virtual camera set in advance in delivery method C are set to four points, but the present disclosure is not limited to this. By increasing the number of viewpoints, it is possible to increase the viewpoints that can be selected by the user. The video delivery apparatus 100 can send to the video viewing apparatus 110 object data corresponding to an event time designated by the video viewing apparatus 110. As a result, the time of the virtual viewpoint video to be reproduced can be designated in delivery method A. Also in delivery method B, since the virtual viewpoint video is generated individually for each delivery destination in the video delivery apparatus 100, the video viewing apparatus 110 can obtain the virtual viewpoint video corresponding to the desired event time.

As described above, by changing the delivery method, even if the communication band of the video viewing apparatus 110 changes or the load of the video delivery apparatus 100 changes, the user can continue viewing the virtual viewpoint video.

Next, processing for complementing the virtual camera when switching from delivery method A to delivery method C will be described. In delivery method A, a virtual camera of an arbitrary position and orientation according to the user's operation is used, but in delivery method C, a virtual camera selected from a plurality of virtual cameras in which the position and orientation is determined in advance is used. In delivery method C, the video generation unit 102 of the video delivery apparatus 100 generates a plurality of virtual viewpoint videos based on a plurality of virtual cameras and delivers the virtual viewpoint video corresponding to the designated virtual camera from the video viewing apparatus 110. In delivery method A, the user can set the event time of the virtual viewpoint video, whereas in delivery method C, the video generation unit 102 determines the event time. Therefore, the position and orientation and the event time of the virtual camera in delivery method C and the position and orientation and the event time of the virtual camera by delivery method A generally do not match. Therefore, when the switching between delivery method A and delivery method C occurs, the event time and the position and orientation of the virtual camera are discontinuously switched, and there is a possibility that an unnatural virtual viewpoint video is reproduced. Therefore, in the present embodiment, when the switching between delivery method A and delivery method C occurs, the continuity of the event time and the continuity of the position and orientation of the virtual camera are maintained as much as possible, thereby reducing the unnaturalness of the virtual viewpoint video that occurs at the time of switching.

FIGS. 7A to 7E are diagrams showing examples of complementing the position and orientation of virtual camera and the event time of the content when switching from delivery method A to delivery method C. In FIG. 7A, it is assumed that the user is viewing the virtual viewpoint video 700 by delivery method A. The video generation unit 112 generates a virtual viewpoint video based on the position and orientation of the virtual camera inputted by the user from the instruction unit 113. The virtual camera position and orientation is represented by X, Y, and Z coordinates representing position in three dimensions and the three angles of Pan, Tilt, and Roll. For example, in FIG. 7A, X=200, Y=250, Z=20, Pan=0, Tilt=10, and Roll=0 are inputted as the position and orientation. The event time of the viewed virtual viewpoint video is 01:20:10. Switching from the state of delivery method A shown in FIG. 7A to delivery method C will be described. FIG. 7E shows a virtual viewpoint video 704 generated by delivery method C. The position and orientation of the virtual camera in delivery method C is X=204, Y=250, Z=220, Pan=0, Tilt=50, and Roll=0. FIGS. 7A to 7E illustrate a situation where a switch from the virtual viewpoint video 700 by delivery method A to the virtual viewpoint video 704 by delivery method C is completed via virtual viewpoint videos 701 to 703 obtained by complementing processing.

Figure 8A:
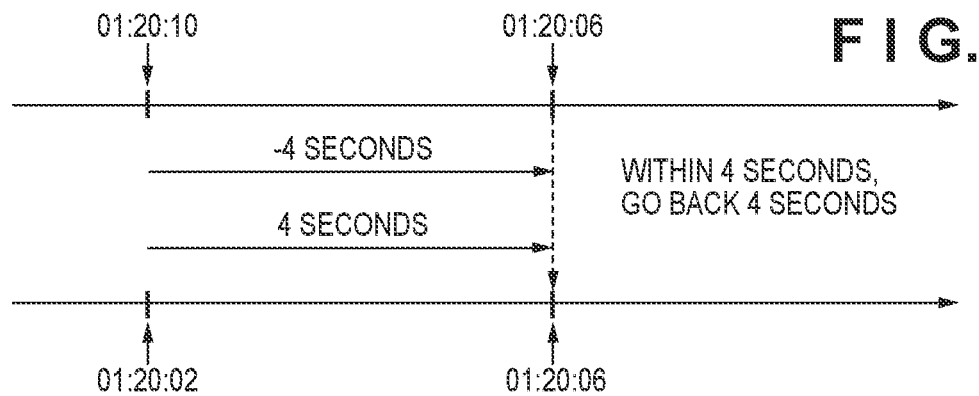
FIGS. 8A to 8D are diagrams for describing event time complementing when switching the method of delivery.
Figure 8B:
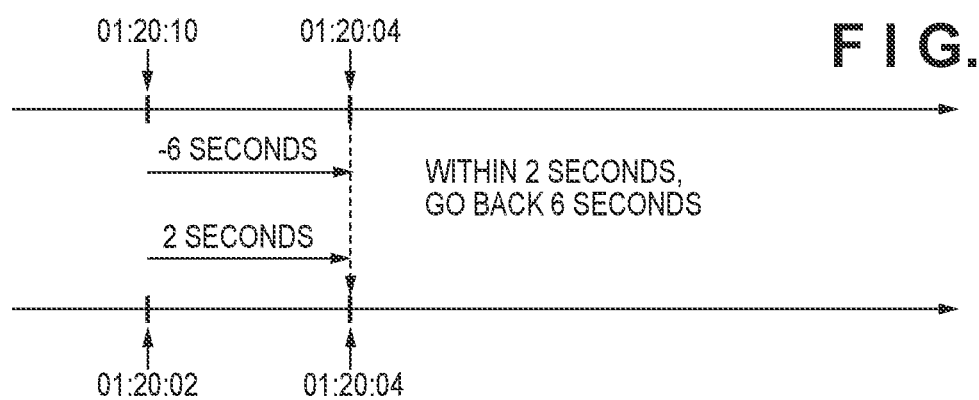
Figure 8C:
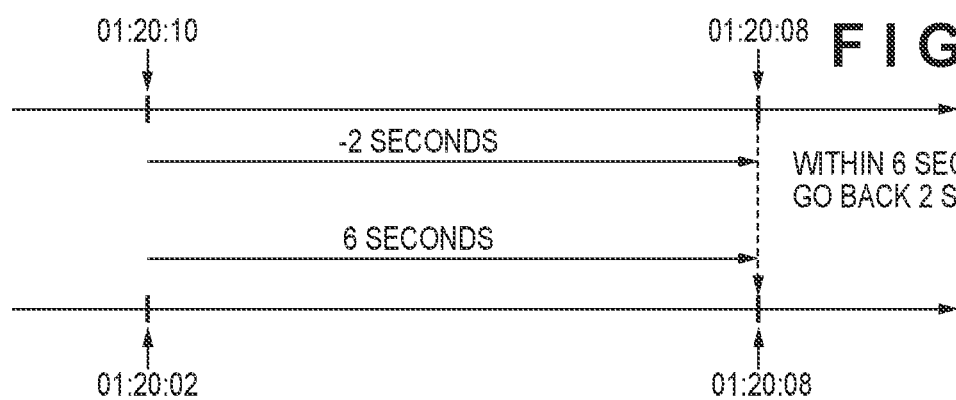

First, complementing of the event time at the time of a delivery method switch will be described with reference to FIGS. 8A to 8D. FIG. 8A is a diagram for explaining switching from delivery method A to delivery method C when switching occurs at the event time 01:20:10 of reproduction by delivery method A. In this example, the event time based on delivery method C is 8 seconds later than the event time based on delivery method A, and the event time of the virtual viewpoint video based on delivery method A and delivery method C is 01:20:10 and 01:20:02, respectively, at the time when the switch occurs. In the example of FIG. 8A, by returning the event time of the virtual viewpoint video by delivery method A (reverse reproduction) to half (4 seconds) of the event time difference (8 seconds) between delivery method A and delivery method C, the event time difference at the time of the switch is eliminated or reduced. Hereinafter, the time for eliminating or reducing the time difference is referred to as elimination time. Note that, in the following, a specific example in which the time difference is eliminated is shown, but the time difference may be reduced so as to be equal to or less than a predetermined time. When switching from delivery method A to delivery method C, the delivery method determination unit 115 calculates the position and orientation and event time of the virtual camera for complementing between the position and orientation and the event time of the current virtual camera and the position and orientation and event time of the virtual camera after switching. That is, while returning the event time from 01:20:10 to 01:20:06, the delivery method determination unit 115 complements the position and orientation of the virtual camera so as to gradually approach the position and orientation of the virtual camera in delivery method C. For example, in order to make the movement of the position of the virtual camera more continuous, the difference in the coordinates before the change of the delivery method from the coordinates after the change of the delivery method is taken, and the complementing is performed with coordinates obtained by dividing the difference into equal intervals by the number of frames of the complementing. By generating virtual viewpoint video based on positions and orientations and event times for complementing which are calculated by the delivery method determination unit 115, it is possible to continuously change the position and orientation and event time of the virtual camera from before to after the change of the delivery method.

For example, the delivery method determination unit 115 confirms the processing state of the video generation unit 112, and calculates the number of frames over which the state before the delivery method is switched can be maintained. For example, the frame rate that can be maintained can be calculated from the reduction rate of the communication band. For example, when the viewing in the steady state is 30 frames per second and the communication band is reduced to ½, 15 frames per second is calculated as a frame rate that can be maintained. In this case, the virtual viewpoint video from the position and orientation of the complemented virtual viewpoint may be generated at 15 frames per second, or may be generated at a frame rate lower than 15 frames per second. However, it is desirable to select the number of frames so that the user can visually recognize the continuity of the movement of the virtual camera. In the case where the event times in the content before and after the delivery method is switched differ, the switch may be performed at double or quadruple reproduction speed, in addition to the frame rate.

Also, with respect to the virtual camera position, the delivery method determination unit 115 calculates virtual camera position information that complements between before and after switching the delivery method. For example, the number of frames+1 to be inserted during the above-described elimination time is calculated by multiplying the above-described maintainable frame rate by the elimination time, and by dividing the difference in position and orientation of the virtual camera by this number, the movement amount of the virtual camera for each frame can be calculated. For example, by multiplying the frame rate (15 frames per second) by the elimination time (4 seconds), 60 frames (the number of frames inserted during the elimination time is 59 because the 60th frame is virtual viewpoint video according to delivery method C) can be obtained. Therefore, by dividing the difference in the position and orientation of the virtual camera before and after switching by 60, the amount of change in the position and orientation of the virtual camera for each frame can be obtained.

For example, when the switching occurs in FIG. 7A and the switching to the delivery method C completes in FIG. 7E, the Z coordinate of the position of the virtual cameras changes from 20 to 220 in the switch from the virtual viewpoint video 700 to the virtual viewpoint video 704. In FIGS. 7A to 7E, the position and orientation and content of the virtual camera for each second in the elimination time are exemplified. As described above, the added position and orientation values of the virtual camera to be complemented are (Coordinates after switching−coordinates before changing)÷(frame rate×elimination time)    Equation 1

In the example shown in FIG. 7, with respect to the Z coordinate, the virtual camera is moved in the Z direction by 10/3 each time, where (220−20) (15×4)=10/3. In FIG. 7B, FIG. 7C, and FIG. 7D, the position of the virtual camera every 1 second (every 15 frames) in a reverse reproduction within the elimination time is shown, and the Z coordinate is increased by 50 (=(10/3)×15). That is, the values of the Z coordinate of the position of the virtual camera derived by the delivery method determination unit 115 are derived as 70, 120, and 170. The delivery method determination unit 115 derives the coordinates of X and Y of the position of the virtual camera in the same manner. This makes it possible for the user to visually recognize the virtual camera to continuously move in the virtual viewpoint video from before to after the delivery method change. By doing so, even when changing to delivery method C in which the virtual camera position is determined in advance, the virtual viewpoint video continuously changes from before to after the change, so that it is possible for the user to continue viewing without losing track of what viewpoint the user is viewing from.

Figure 8D:
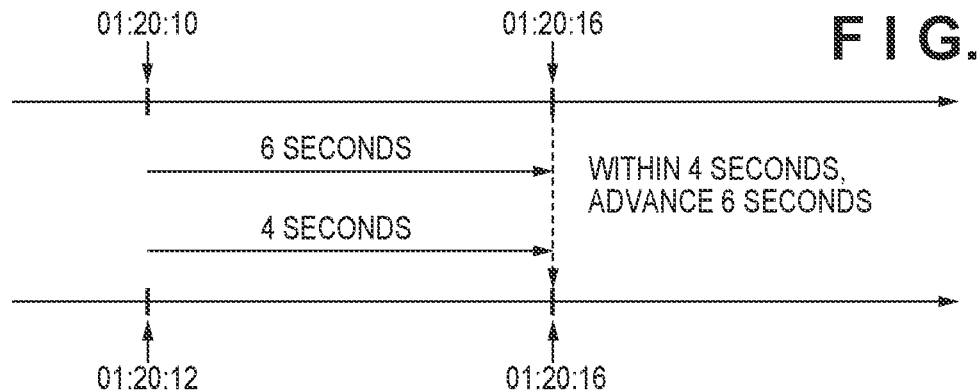

In FIG. 8A, a case in which the difference between the event times of delivery method A and delivery method C is 8 seconds, and half of the difference (4 seconds) is set as the elimination time is described, but the present disclosure is not limited to this, and an elimination time that is shorter than half of the time difference may be set. In this case, the reverse reproduction is performed at a speed that is a predetermined multiple which is larger than 1× speed in the elimination time. For example, in FIG. 8B, a case where an elimination time of 2 seconds is set for a time difference of 8 seconds. In this case, since it goes back 6 seconds in 2 seconds, a reverse reproduction at triple speed is performed. Alternatively, an elimination time that is longer than half the time difference may be set. In this case, the reverse reproduction is performed at a speed that is a predetermined multiple which is smaller than 1× speed in the elimination time. For example, in FIG. 8C, a case where an elimination time of 6 seconds is set for a time difference of 8 seconds. In this case, since it goes back 2 seconds in 6 seconds, a reverse reproduction at ⅓ speed is performed. Further, the event time of delivery method C may be later than the event time of delivery method A. For example, as shown in FIG. 8D, when a time difference of 2 seconds is to be eliminated in an elimination time of 4 seconds, the generation of the virtual viewpoint video according to delivery method A may be generated at 3/2× speed.

The video viewing apparatus 110 can obtain from the video delivery apparatus 100 three-dimensional shape information in the elimination time by designating the event time. Alternatively, the video viewing apparatus 110 may hold the most recent three-dimensional shape information within a predetermined time received from the video delivery apparatus 100 and that may be used. Also, the elimination time may be made to be the difference in event time. For example, in FIG. 8A, the elimination time can be set to be 8 seconds. In this case, the current position and orientation of the virtual camera is moved to the position and orientation of the virtual camera of delivery method C over 8 seconds, and virtual viewpoint video is generated using the object data of the event time 01:20:10. As a result, the time of the virtual viewpoint video is stopped at the event time 01:20:10, and a virtual viewpoint video in which only the position and orientation of the virtual camera changes during the elimination time is generated. When the elimination time of 8 seconds elapses, the virtual viewpoint video of the event time 01:20:10 onwards is reproduced by delivery method C. By doing so, it is unnecessary to newly receive object data from the video delivery apparatus, and therefore it is possible to transition to delivery method C while maintaining the normal frame rate even during the elimination time.

A method of complementing the virtual camera at the time of switching from delivery method A to delivery method C has been described above. When switching from delivery method C to delivery method A, the position and orientation of the virtual camera that has been selected in delivery method C can be used as the initial state of the position and orientation of the virtual camera in delivery method A. This method can also be applied at the time of switching from delivery method C to delivery method B.

Next, an exemplary user interface displayed to the user through the video display unit 116 by the delivery method determination unit 115 will be described with reference to FIGS. 9A to 9D. FIGS. 9A to 9D show examples of screens that the user views. These screens are examples of display performed by the video display unit 116 using the display unit 215. Item 901 of FIG. 9A and item 921 of FIG. 9C show the current delivery method. The item 901 is displayed as "edge mode", and indicates that the virtual viewpoint video is reproduced and displayed by delivery method A, that is, that the displayed virtual viewpoint video is generated by the video generation unit 112 of the video viewing apparatus 110. The item 921 is displayed as "cloud mode", and indicates that delivery method B or delivery method C is being used, that is, that the virtual viewpoint video that is being displayed is generated by the video generation unit 102 of the video delivery apparatus 100.

Figure 9A:
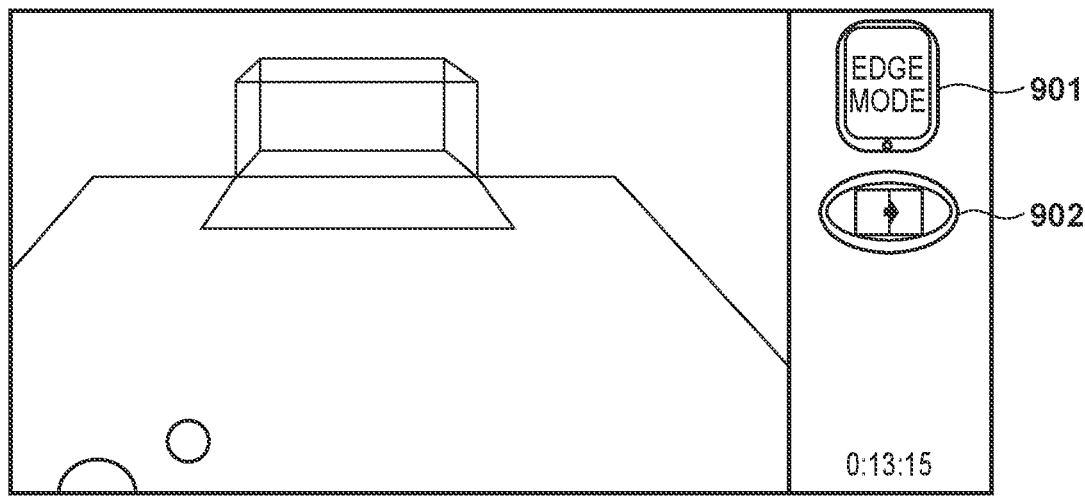
FIGS. 9A to 9D are diagrams illustrating an example of a display of a user interface by a delivery method determination unit.
Figure 9B:
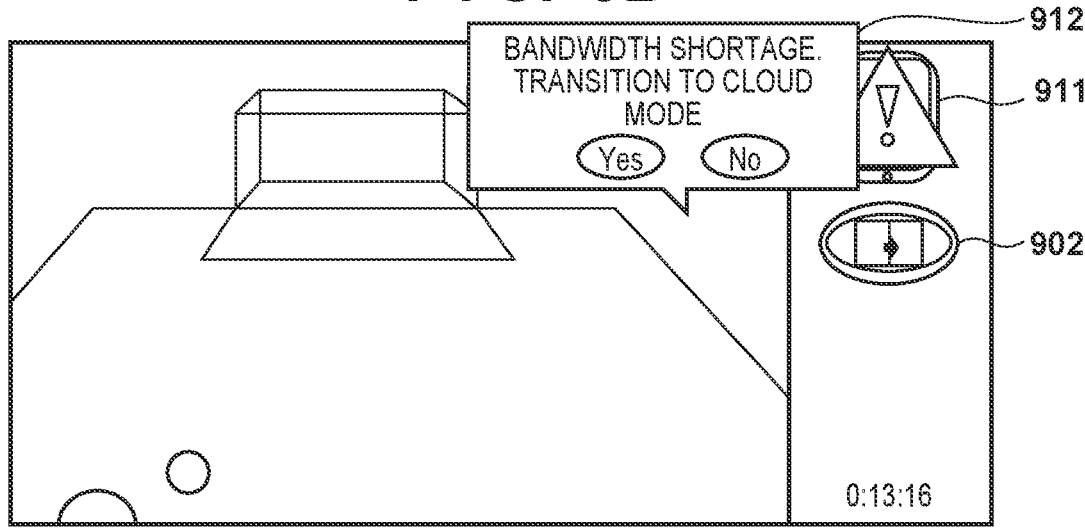
Figure 9C:
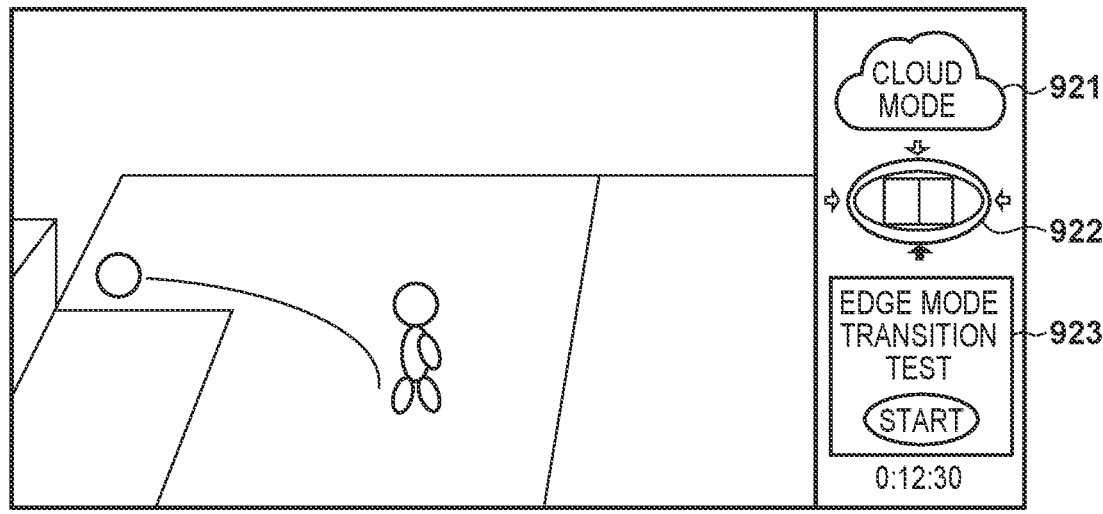

In the item 902 of FIG. 9A and FIG. 9B, the position and orientation (direction) of the current virtual camera are displayed by an arrow. Item 911 in FIG. 9B warns the user that a change in delivery method from delivery method A is required. This warning is made upon the number of accumulated frames falling below the threshold F1, as described above with reference to FIG. 5. Also, a message 912 in FIG. 9B prompts the user to change the delivery method. As the bandwidth of the network decreases from the state of FIG. 9A, a warning such as item 911 in FIG. 9B and the message 912 prompting a change of delivery method are displayed. When the change in delivery method is instructed by clicking "YES" in the message 912 of the FIG. 9B, FIG. 9C is displayed. FIG. 9C shows an example of a display according to delivery method C. The case of switching from delivery method A to delivery method C has been described, but when switching to delivery method B is possible, the method is switched to delivery method B by pressing the YES button of the message 912. In the case of display in which delivery method B is used, the item 902 is displayed instead of the item 922 in FIG. 9C. In delivery method B, it is possible to instruct an arbitrary virtual camera position and orientation from the video viewing apparatus 110. When "NO" is clicked in the message 912, the display of the virtual viewpoint video by delivery method A continues. However, when it is determined that the delivery method needs to be changed in step S445 of FIG. 4A (for example, when the number of accumulated frames falls below the threshold F2) the delivery method is automatically switched.

Figure 9D:
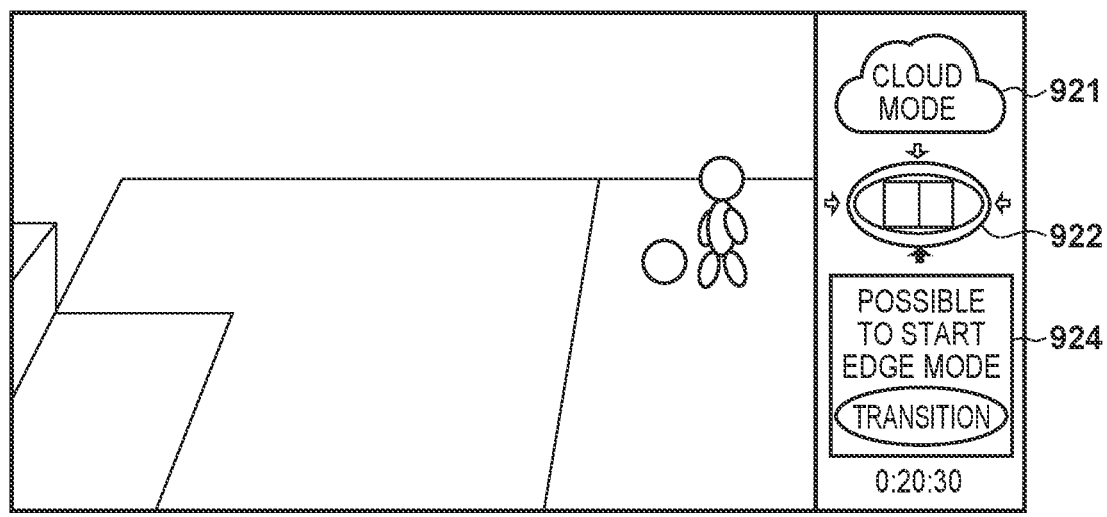

Item 922 of FIG. 9C shows virtual cameras that can be selected in delivery method C by arrows, and the virtual camera among these that is currently selected is indicated by a black arrow. In addition, in delivery method B or delivery method C, a message 923 for starting a test to confirm whether it is possible to switch to delivery method A is displayed. The user clicks on "start" in message 923 in FIG. 9C to initiate delivery of test data for testing whether it is possible to change to delivery method A as described above. Then, when the delivery method is determined to be changeable, a display item 924 is displayed that recommends a change to delivery method A, as shown in FIG. 9D. When the user clicks "Transition" in the display item 924, the delivery method is changed to delivery method A, and the state shown in FIG. 9A is transitioned into.

Next, the item 902 of FIG. 9A will be described. The item 902 of FIG. 9A shows a bird's-eye view of the position of the virtual camera. FIG. 9A shows a screen where the virtual viewpoint video is viewed by delivery method A. In delivery method A, the user can freely operate the position of the virtual camera. In item 902, the position of the virtual camera in the stadium is represented by an arrow. When the user moves the position of the virtual camera, the arrow can move (the position and the direction of the arrow change) to indicate the position and orientation of the virtual camera to the user. When the position and orientation of the virtual camera is fixed in advance as in delivery method C, selectable virtual cameras are displayed as in item 922 in FIG. 9C. For example, in the example of delivery method C described above, the positions and orientations of the four selectable virtual cameras are displayed by arrows, and the arrow corresponding to the currently selected virtual camera is highlighted.

As described above, even if a change in the delivery environment such as the network makes it difficult to view a virtual viewpoint video, by changing the delivery method of the virtual viewpoint video, it is possible to continue delivering the virtual viewpoint video to the user.

(Other Embodiments)

In the embodiment described above, a case of delivering a virtual viewpoint video generated using object data generated based on a plurality of captured images obtained by a plurality of image capturing apparatuses has been described. However, the present disclosure is not limited to this, and the present embodiment is also applicable to images generated using three-dimensional shape data and texture data generated as, for example, computer graphics (CG) or the like. The video in this case may be, for example, a video game. For example, in the case of delivering a video game, a configuration that switches whether to deliver, to a user terminal, data corresponding to the object data in the present embodiment or to deliver, to the user terminal, video generated by an external apparatus by designating a virtual viewpoint may be adopted.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-114389, filed Jul. 9, 2021, which is hereby incorporated by reference herein in its entirety.

What is claimed is:

1. An information processing apparatus, comprising:
one or more memories storing instructions; and
one or more processors executing the instructions to:
determine which of a first method for generating virtual viewpoint video upon receiving from an external apparatus object data used for generation of the virtual viewpoint video or a second method for receiving from the external apparatus virtual viewpoint video generated upon a virtual viewpoint designated for generation of the virtual viewpoint video to use as a delivery method for delivery of the virtual viewpoint video; and
obtain the virtual viewpoint video by using the determined delivery method,
wherein, in a case of using the second method, one of a plurality of second methods, having different methods of designating a virtual viewpoint, to be performed on the external apparatus is selected, and
the plurality of second methods comprises:
a third method of transmitting to the external apparatus a position of a virtual viewpoint designated by a user and a viewing direction from the virtual viewpoint, and receiving from the external apparatus virtual viewpoint video corresponding to the transmitted virtual viewpoint position and viewing direction;
a fourth method of transmitting to the external apparatus an instruction to select one of a plurality of virtual viewpoints set in advance, and receiving from the external apparatus virtual viewpoint video corresponding to the selected virtual viewpoint.

2. The information processing apparatus according to claim 1, wherein it is determined, based on a communication band used for receiving the object data, which of the delivery methods to use.

3. The information processing apparatus according to claim 1, wherein it is determined, based on a number of accumulated frames waiting to be displayed in the obtained virtual viewpoint video, which of the delivery methods to use.

4. The information processing apparatus according to claim 1, wherein it is determined, based on a number of frames of virtual viewpoint video per a time obtained from object data for testing received from the external apparatus, determines which of the delivery methods to use.

5. The information processing apparatus according to claim 1, wherein the one or more processors executes the instructions to, based on a result of the determination, notify a user that a switch from the first method to the second method will be performed.

6. The information processing apparatus according to claim 5, wherein, in a case where after the notification the user instructs to switch from the first method to the second method, it is determined to use the second method to obtain virtual viewpoint video for display.

7. The information processing apparatus according to claim 1, wherein the one or more processors executes the instructions to, in a case where it is possible to use the first method and the second method, allow a user to select either the first method or the second method.

8. The information processing apparatus according to claim 1, it is determined so that the third method is preferentially used over the fourth method.

9. The information processing apparatus according to claim 1, wherein the one or more processors executes the instructions to, in a case where it is determined to switch from the first method to the fourth method, obtain virtual viewpoint video that gradually changes a virtual viewpoint designated by a user to one of the plurality of virtual viewpoints used in the fourth method.

10. The information processing apparatus according to claim 9, wherein, in the gradually changing a virtual viewpoint, a difference between the time of the virtual viewpoint video being displayed using the first method and a time of the virtual viewpoint video obtained by the fourth method is made smaller by stopping a time of the virtual viewpoint video displayed using the first method, returning the time at a predetermined speed, or advancing the time at a predetermined speed.

11. A video display system comprising a video delivery apparatus for performing video delivery and a video viewing apparatus for displaying video delivered by the video delivery apparatus, wherein
the video viewing apparatus comprises:
one or more memories storing instructions; and
one or more processors executing the instructions to:
determine which of a first method for generating virtual viewpoint video upon receiving, from the video delivery apparatus, object data used for generation of the virtual viewpoint video or a second method for receiving, from the video delivery apparatus, virtual viewpoint video generated upon a virtual viewpoint designated for generation of the virtual viewpoint video to use as a delivery method for delivery of the virtual viewpoint video; and
obtain the virtual viewpoint video by using the determined delivery method,
wherein, in a case of using the second method, one of a plurality of second methods, having different methods of designating a virtual viewpoint, to be performed on the external apparatus is selected, and
the plurality of second methods comprises:
a third method of transmitting to the external apparatus a position of a virtual viewpoint designated by a user and a viewing direction from the virtual viewpoint, and receiving from the external apparatus virtual viewpoint video corresponding to the transmitted virtual viewpoint position and viewing direction;
a fourth method of transmitting to the external apparatus an instruction to select one of a plurality of virtual viewpoints set in advance, and receiving from the external apparatus virtual viewpoint video corresponding to the selected virtual viewpoint, and the video delivery apparatus comprises:
one or more memories storing instructions; and
one or more processors executing the instructions to:
receive from the video viewing apparatus a designation of either the first method or the second method; and
output to the video viewing apparatus the object data or the virtual viewpoint video based on the received designation.

12. An information processing method, comprising:
determining which of a first method for generating virtual viewpoint video upon receiving from an external apparatus object data used for generation of the virtual viewpoint video or a second method for receiving from the external apparatus virtual viewpoint video generated upon a virtual viewpoint designated for generation of the virtual viewpoint video to use as a delivery method for delivery of the virtual viewpoint video; and obtaining the virtual viewpoint video by using the delivery method determined in the determining, wherein, in a case of using the second method, one of a plurality of second methods, having different methods of designating a virtual viewpoint, to be performed on the external apparatus is selected, and the plurality of second methods comprises:
- a third method of transmitting to the external apparatus a position of a virtual viewpoint designated by a user and a viewing direction from the virtual viewpoint, and receiving from the external apparatus virtual viewpoint video corresponding to the transmitted virtual viewpoint position and viewing direction;
- a fourth method of transmitting to the external apparatus an instruction to select one of a plurality of virtual viewpoints set in advance, and receiving from the external apparatus virtual viewpoint video corresponding to the selected virtual viewpoint.

13. A non-transitory computer-readable storage medium storing a program for causing a computer to execute an information processing method, comprising:

determining which of a first method for generating virtual viewpoint video upon receiving from an external apparatus object data used for generation of the virtual viewpoint video or a second method for receiving from the external apparatus virtual viewpoint video generated upon a virtual viewpoint designated for generation of the virtual viewpoint video to use as a delivery method for delivery of the virtual viewpoint video; and obtaining the virtual viewpoint video by using the delivery method determined in the determining, wherein, in a case of using the second method, one of a plurality of second methods. having different methods of designating a virtual viewpoint, to be performed on the external apparatus is selected, and the plurality of second methods comprises:
- a third method of transmitting to the external apparatus a position of a virtual viewpoint designated by a user and a viewing direction from the virtual viewpoint, and receiving from the external apparatus virtual viewpoint video corresponding to the transmitted virtual viewpoint position and viewing direction;
- a fourth method of transmitting to the external apparatus an instruction to select one of a plurality of virtual viewpoints set in advance, and receiving from the external apparatus virtual viewpoint video corresponding to the selected virtual viewpoint.

* * * * *